(12) United States Patent
Woodsum

(10) Patent No.: US 10,880,149 B2
(45) Date of Patent: *Dec. 29, 2020

(54) TRANSPOSITIONAL MODULATION AND DEMODULATION

(71) Applicant: TM IP HOLDINGS, LLC, Tucson, AZ (US)

(72) Inventor: Harvey C. Woodsum, Bedford, NH (US)

(73) Assignee: TM IP Holdings, LLC, Tucson, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/819,944

(22) Filed: Mar. 16, 2020

(65) Prior Publication Data
US 2020/0220765 A1 Jul. 9, 2020

Related U.S. Application Data

(63) Continuation of application No. 16/432,521, filed on Jun. 5, 2019, now Pat. No. 10,594,539.
(Continued)

(51) Int. Cl.
*H04L 27/36* (2006.01)
(52) U.S. Cl.
CPC .................................. *H04L 27/36* (2013.01)
(58) Field of Classification Search
CPC ..................................................... H04L 27/36
See application file for complete search history.

(56) References Cited

U.S. PATENT DOCUMENTS

| 3,706,945 A | 12/1972 | Yanagidaira |
| 3,944,928 A | 3/1976 | Augenblick |

(Continued)

FOREIGN PATENT DOCUMENTS

| JP | H0563594 | 3/1993 |
| JP | H06307875 | 11/1994 |

(Continued)

OTHER PUBLICATIONS

Chiu et al: "A 900 MHz UHF RFID Reader Transceiver IC", IEEE Journal of Solid-State Circuits, IEEE Service Center, Piscataway, NJ, USA vol. 42, No. 12, Dec. 1, 2007, pp. 2822-2833.

(Continued)

*Primary Examiner* — Nader Bolourchi
(74) *Attorney, Agent, or Firm* — Fish & Richardson P.C.

(57) ABSTRACT

Methods, systems, and apparatus, including computer programs encoded on a computer storage medium, for modulating and demodulating transpositional modulated (TM) signals. One aspect features a method of modulating a carrier signal that includes the operations of generating a non-transpositional modulation (non-TM) signal from a first data signal, where the non-TM signal has a frequency spectrum that occupies a bandwidth. Generating a TM signal by generating a modulation from a second data signal, and shifting the modulation signal in frequency to an upper or lower sideband in the frequency spectrum of the non-TM signal which lies within the bandwidth of the non-TM signal, and where the power of the first modulated signal is less than a power of the non-TM signal. Combining the non-TM signal with the TM signal on a common carrier signal to provide a combined signal. Transmitting the combined signal.

20 Claims, 23 Drawing Sheets

Related U.S. Application Data

(60) Provisional application No. 62/680,860, filed on Jun. 5, 2018.

(56) References Cited

U.S. PATENT DOCUMENTS

| | | |
|---|---|---|
| 3,968,486 A | 7/1976 | Gerdes |
| 4,259,888 A | 4/1981 | Gross |
| 4,301,415 A | 11/1981 | McFayden |
| 4,348,734 A | 9/1982 | Dougherty |
| 4,584,534 A | 4/1986 | Lijphart et al. |
| 4,613,974 A | 9/1986 | Vokac et al. |
| 4,680,633 A | 7/1987 | Gerdes et al. |
| 4,989,219 A | 1/1991 | Gerdes et al. |
| 5,021,786 A | 6/1991 | Gerdes |
| 5,119,391 A | 6/1992 | Maeda |
| 5,124,706 A | 6/1992 | Gerdes |
| 5,184,218 A | 2/1993 | Gerdes |
| 5,200,715 A | 4/1993 | Gerdes et al. |
| 5,327,237 A | 7/1994 | Gerdes et al. |
| 5,511,100 A | 4/1996 | Lundberg et al. |
| 5,557,333 A | 9/1996 | Jungo et al. |
| 5,675,590 A | 10/1997 | Alamouti |
| 6,052,410 A | 4/2000 | Okita |
| 6,157,752 A | 12/2000 | Wood |
| 6,173,062 B1 | 1/2001 | Dibachi et al. |
| 6,522,697 B1 | 2/2003 | Spickermann |
| 6,559,757 B1 | 5/2003 | Deller et al. |
| 6,639,950 B1 | 10/2003 | Lagerblom |
| 6,788,154 B2 | 9/2004 | Maneatis |
| 6,829,310 B1 | 12/2004 | Nata et al. |
| 6,867,987 B2 | 3/2005 | Cheng et al. |
| 7,340,001 B2 | 3/2008 | Smith et al. |
| 7,856,050 B1 | 12/2010 | Wiss et al. |
| 7,952,408 B2 | 5/2011 | Eisenstadt |
| 7,991,070 B2 | 8/2011 | Batshon et al. |
| 8,472,514 B2 | 6/2013 | Dabiri |
| 8,537,952 B1 | 9/2013 | Arora |
| 8,675,769 B1 | 3/2014 | Eliaz |
| 8,719,656 B2 | 5/2014 | Arabaci et al. |
| 9,014,293 B2 | 4/2015 | Gerdes |
| 9,194,946 B1 | 11/2015 | Vacanti |
| 9,338,041 B1 | 5/2016 | Gerdes |
| 9,338,042 B1 | 5/2016 | Gerdes |
| 9,379,925 B2 | 6/2016 | Gerdes |
| 9,426,014 B1 | 8/2016 | Gerdes |
| 9,455,852 B1 | 9/2016 | Gerdes |
| 9,455,863 B1 | 9/2016 | Gerdes |
| 9,461,854 B1 | 10/2016 | Gerdes |
| 9,473,983 B1 | 10/2016 | Gerdes et al. |
| 9,515,815 B2 | 12/2016 | Gerdes |
| 9,516,490 B1 | 12/2016 | Gerdes et al. |
| 9,621,275 B2 | 4/2017 | Kojima |
| 9,621,386 B2 | 4/2017 | Gerdes |
| 9,621,398 B2 | 4/2017 | Gerdes |
| 9,628,318 B1 | 4/2017 | Gerdes et al. |
| 9,716,997 B1 | 7/2017 | Gerdes et al. |
| 9,787,510 B2 | 10/2017 | Gerdes |
| 9,867,086 B2 | 1/2018 | Gerdes et al. |
| 9,882,762 B2 | 1/2018 | Gerdes et al. |
| 9,882,764 B1 | 1/2018 | Woodsum et al. |
| 9,883,375 B2 | 1/2018 | Gerdes et al. |
| 9,893,915 B2 | 2/2018 | Gerdes |
| 9,917,721 B2 | 3/2018 | Gerdes |
| 9,998,311 B2 | 6/2018 | Woodsum |
| 10,305,717 B2 | 5/2019 | Woodsum |
| 10,594,539 B2 * | 3/2020 | Woodsum ............... H04L 27/34 |
| 2001/0038309 A1 | 10/2001 | Hagemeyer |
| 2002/0039887 A1 | 4/2002 | Delabbaye |
| 2003/0045255 A1 | 3/2003 | Nakamura |
| 2003/0053794 A1 | 3/2003 | Krouglov |
| 2003/0071684 A1 | 4/2003 | Noori |
| 2003/0108088 A1 | 6/2003 | Odenwalder |
| 2003/0142741 A1 | 7/2003 | Hartmann |
| 2004/0247041 A1 | 12/2004 | Biedka et al. |
| 2004/0252531 A1 | 12/2004 | Cheng et al. |
| 2005/0123061 A1 | 6/2005 | Smith |
| 2005/0200391 A1 | 9/2005 | Steinbach et al. |
| 2006/0006914 A1 | 1/2006 | Fan-Jiang |
| 2006/0187755 A1 | 8/2006 | Tingley |
| 2006/0197564 A1 | 9/2006 | Yen |
| 2007/0041485 A1 | 2/2007 | Chang |
| 2008/0253479 A1 | 10/2008 | Davidow |
| 2009/0135957 A1 | 5/2009 | Norris |
| 2009/0154589 A1 | 6/2009 | Monnerie |
| 2009/0168917 A1 | 7/2009 | Noda |
| 2009/0322312 A1 | 12/2009 | Arnborg |
| 2010/0002751 A1 | 1/2010 | Dent |
| 2010/0128713 A1 | 5/2010 | LeBars |
| 2011/0043039 A1 | 2/2011 | Mancebo |
| 2011/0051780 A1 | 3/2011 | Kawasaki |
| 2011/0151821 A1 | 6/2011 | Sorrells |
| 2011/0222621 A1 | 9/2011 | Christensen et al. |
| 2012/0171963 A1 | 7/2012 | Tsfaty |
| 2013/0121442 A1 | 5/2013 | Baik |
| 2014/0201212 A1 | 7/2014 | Qi |
| 2014/0269861 A1 | 9/2014 | Eliaz |
| 2014/0269969 A1 | 9/2014 | Gerdes |
| 2015/0023456 A1 | 1/2015 | Vann et al. |
| 2015/0200796 A1 | 7/2015 | Gerdes |
| 2016/0105302 A1 | 4/2016 | Madaiah |
| 2016/0173302 A1 | 6/2016 | Gerdes |
| 2016/0197751 A1 | 7/2016 | Gerdes |
| 2017/0026211 A1 | 1/2017 | Gerdes |
| 2017/0033968 A1 | 2/2017 | Gerdes |
| 2017/0085404 A1 | 3/2017 | Gerdes |
| 2017/0214560 A1 | 7/2017 | Gerdes et al. |
| 2017/0214563 A1 | 7/2017 | Gerdes et al. |
| 2017/0310526 A1 | 10/2017 | Gerdes |
| 2017/0311205 A1 | 10/2017 | Gerdes |
| 2017/0325085 A1 | 11/2017 | Gerdes |
| 2018/0034672 A1 | 2/2018 | Gerdes |
| 2018/0123839 A1 | 5/2018 | Chung |
| 2018/0152332 A1 | 5/2018 | Gerdes |
| 2018/0152833 A1 | 5/2018 | Gerdes et al. |
| 2018/0152863 A1 | 5/2018 | Gerdes et al. |
| 2018/0167243 A1 | 6/2018 | Gerdes |
| 2018/0302263 A1 | 10/2018 | Woodsum |
| 2019/0173717 A1 | 6/2019 | Woodsum |
| 2019/0372822 A1 | 12/2019 | Woodsum |

FOREIGN PATENT DOCUMENTS

| | | |
|---|---|---|
| JP | 2001186376 | 7/2001 |
| JP | 2002505910 | 2/2002 |
| JP | 2004159985 | 6/2004 |
| TW | 201740713 | 11/2017 |
| TW | 201740714 | 11/2017 |
| TW | 201742414 | 12/2017 |
| WO | WO2004040403 | 5/2004 |
| WO | WO2012082781 | 6/2012 |
| WO | WO2014143046 | 9/2014 |
| WO | WO2014145868 | 9/2014 |
| WO | WO2017019130 | 2/2017 |
| WO | WO2017019131 | 2/2017 |
| WO | WO2017184743 | 10/2017 |
| WO | WO2017189362 | 11/2017 |
| WO | WO2017189365 | 11/2017 |

OTHER PUBLICATIONS

Evans et al: "The Rapidly Deployable Radio Network", IEEE Journal on Selected Areas in Communications, IEEE Service Center, vol. 17, No. 4, Apr. 1, 1999, pp. 689-703.

Leclerc et al: "Performance analysis of an in-band COFDM / FM digital audio broadcasting system", Electrical and Computer Engineering, Sep. 14-17, 1993, pp. 652-655.

Liu et al: "High Order QAM Signals Recognition Based on Layered Modulation", ICCCAS 2009. International Conference on Communications, Circuits and Systems, IEEE, Jul. 23, 2009, pp. 73-76.

Nguyen, "The Behavior of a Costas Loop in the Presence of Space Telemetry Signals," IEEE Transactions on Communications, Jan. 1992, 40: 190-198, 10 pages.

(56) References Cited

OTHER PUBLICATIONS

PCT International Search Report and Written Opinion in International Appln. No. PCT/US2019/035651, dated Sep. 13, 2019.
Scarlart et al.: "Performance Analysis of a COFDM/FM In-band Digital Audio Broadcasting System", IEEE Transactions on Broadcasting, IEEE Service Center, Piscataway, NJ, US; vol. 43, No. 2, dated Jun. 1, 1997, XP01100607; pp. 191-198.

* cited by examiner

1700

Let $\underline{C} = c(L,K)\}$ be a complex modulation matrix where L is the frequency and K is the frame number.
Arrange the elements of C as follows:

$$\underline{C} = \begin{vmatrix} C(L,1) & C(L,2) & C(L,3) & \cdots \\ C(L,2) & C(L,3) & C(L,4) & \cdots \\ C(L,3) & C(L,4) & C(L,5) & \cdots \end{vmatrix}$$

Note: there is one demodulator for each band and each signal is formed after complex translation. The # is the pseudo-inverse constructed using SVD Similarly when the signal plus noise data S is received, it is arranged into a matrix comprising set of frame (column) vectors, we arrange the matrix of received signal plus noise vectors as follows:

$$\underline{S} = \begin{vmatrix} \underline{S1} & \underline{S2} & \underline{S3} & \cdots \\ \underline{S2} & \underline{S3} & \underline{S4} & \cdots \\ \underline{S3} & \underline{S4} & \underline{S5} & \cdots \end{vmatrix}$$

Multi-Frame Demodulator
One for each band
our example uses
3 frames, we actually use 6

$D(L) = \underline{C}(L,:)^* S^{\#}$

---
STEP 1 In MAKING COEFFICIENTS

Solve $C(n,:) = \underline{K}\,\underline{S}(n,:) =$ , L= {0, 1, 2}
$\underline{K}$ = coefficient vector(s)

---

STEP 2 : SOLVE FOR COEFFICIENTS USING PSEUDO-INVERSE VIA Singular Value Decomposition

$\underline{K} = \underline{C}^* \underline{S}^{\#}$, $\underline{S}^{\#}$ is the pseudo-inverse of $\underline{S}$ $\underline{S} = \Sigma i\, \sigma i\, \underline{Ui}\, (\underline{Vi^*})^T$ Sum is over the non-trivial singular vectors . .determined by the rank of the matrix. U, V are left and right singular vectors, * is complex conjugate, T is transpose For Moore-Penrose Pseudo-Inverse, take the Hermitian Conjugate of the above Result and then reciprocate the singular values σ |

$\underline{S}^{\#} = \Sigma I\, (1/\sigma i)\, \underline{Vi}\, (\underline{Ui^*})^T$

FIG. 17

TRANSPOSITIONAL MODULATION AND DEMODULATION

CROSS-REFERENCE TO RELATED APPLICATIONS

This application is a continuation of U.S. application Ser. No. 16/432,521, filed on Jun. 5, 2019, which claims the benefit of the filing date of U.S. Provisional Application No. 62/680,860, filed on Jun. 5, 2018. The contents of U.S. Application No. 62/680,860 and Ser. No. 16/432,521 are incorporated herein by reference in their entirety.

BACKGROUND

Carrier modulation techniques are used to transmit information signals from one location to another. Traditional signal modulation techniques include, for example, amplitude modulation (AM), frequency modulation (FM), phase modulation (PM). In addition, complex modulation techniques exist that incorporate aspects of AM, FM, and PM such as quadrature phase shift keying (QPSK), amplitude phase shift keying (APSK) and including quadrature amplitude modulation (QAM).

SUMMARY

This specification relates to methods and systems for conducting electronic communications using transpositional modulation (TM). More specifically, the specification relates to methods and systems for generating TM signals and methods and systems for demodulating TM signals.

In a first aspect, the disclosure features methods of modulating a carrier signal that include the operations of generating a non-transpositional modulation (non-TM) signal from a first data signal, where the non-TM signal having a frequency spectrum that occupies a bandwidth. Generating a first TM signal by generating a first modulation from a second data signal, and shifting the first modulation signal in frequency to an upper sideband in the frequency spectrum of the non-TM signal which lies within the bandwidth of the non-TM signal to provide the first TM signal, and where power of the first modulated signal is less than a power of the non-TM signal. Generating a second TM signal by generating a second modulation signal from a third data signal, and shifting the second modulation signal in frequency to a lower sideband in the frequency spectrum of the non-TM signal which lies within the bandwidth of the non-TM signal to provide the second TM signal, and where the power of the second modulated signal is less than the power of the non-TM signal. Combining the non-TM signal with the first TM signal and the second TM signal on a common carrier signal to provide a combined signal. Transmitting the combined signal.

In a second aspect, the disclosure features methods of modulating a carrier signal that include the operations of generating a non-transpositional modulation (non-TM) signal from a first data signal, where the non-TM signal having a frequency spectrum that occupies a bandwidth. Generating a first TM signal by generating a first modulation from a second data signal, and shifting the first modulation signal in frequency to an upper or lower sideband in the frequency spectrum of the non-TM signal which lies within the bandwidth of the non-TM signal to provide the first TM signal, and where power of the first modulated signal is less than a power of the non-TM signal. Combining the non-TM signal with the first TM signal on a common carrier signal to provide a combined signal. Transmitting the combined signal.

In a third aspect, the disclosure features a signal transmitter configured to perform operations that include generating a non-transpositional modulation (non-TM) signal from a first data signal, where the non-TM signal having a frequency spectrum that occupies a bandwidth. Generating a first TM signal by generating a first modulation from a second data signal, and shifting the first modulation signal in frequency to an upper sideband in the frequency spectrum of the non-TM signal which lies within the bandwidth of the non-TM signal to provide the first TM signal, and where power of the first modulated signal is less than a power of the non-TM signal. Generating a second TM signal by generating a second modulation signal from a third data signal, and shifting the second modulation signal in frequency to a lower sideband in the frequency spectrum of the non-TM signal which lies within the bandwidth of the non-TM signal to provide the second TM signal, and where the power of the second modulated signal is less than the power of the non-TM signal.

In a fourth aspect, the disclosure features a signal transmitter configured to perform operations that include generating a non-transpositional modulation (non-TM) signal from a first data signal, where the non-TM signal having a frequency spectrum that occupies a bandwidth. Generating a first TM signal by generating a first modulation from a second data signal, and shifting the first modulation signal in frequency to an upper or lower sideband in the frequency spectrum of the non-TM signal which lies within the bandwidth of the non-TM signal to provide the first TM signal, and where power of the first modulated signal is less than a power of the non-TM signal. Combining the non-TM signal with the first TM signal on a common carrier signal to provide a combined signal. Transmitting the combined signal.

These and other implementations can each optionally include one or more of the following features.

In some implementations, the bandwidth of the non-TM signal is defined by a spectral mask. In some implementations, the power of the first TM signal is at least 3 dB less than the power of the non-TM signal. In some implementations, the power of the first TM signal is at least 20 dB less than the power of the non-TM signal.

In some implementations, the non-TM signal is a QAM signal.

In some implementations, the first modulation signal is a first complex modulated signal and the second modulation signal is a second complex modulated signal. In some implementations, the first modulation signal is modulated in both amplitude and phase, and where the second modulation signal is modulated in both amplitude and phase.

In some implementations, a symbol constellation of the non-TM signal is larger than a symbol constellation of the first TM signal.

In some implementations, a bandwidth of the combined signal is approximately the same as the bandwidth of the non-TM signal with the spectrum of the combined signal lying within a spectral mask of non-TM signal. In some implementations, a spectral efficiency of the combined signal is greater than 14 bps/Hz, for a 40 dB signal-to-noise ratio (SNR) of the non-TM signal.

In some implementations, generating the first TM signal includes filtering the first modulation signal to shape a spectrum of the first modulation signal based on spectral mask of the non-TM signal. In some implementations, filtering the first modulation signal shapes the first modulation signal to correspond to spectral mask of the non-TM signal.

In some implementations, shifting the first modulation signal in frequency to the upper sideband in the frequency spectrum of the non-TM signal includes shifting the first modulation signal in frequency to a null of the upper sideband in the frequency spectrum of the non-TM signal. In some implementations, shifting the first modulation signal in frequency to the upper sideband in the frequency spectrum of the non-TM signal places the first TM signal at an upper frequency spacing that is approximately orthogonal to the non-TM signal.

In some implementations, shifting the second modulation signal in frequency to the lower sideband in the frequency spectrum of the non-TM signal includes shifting the second modulation signal in frequency to a null of the lower sideband in the frequency spectrum of the non-TM signal. In some implementations, shifting the second modulation signal in frequency to the lower sideband in the frequency spectrum of the non-TM signal places the first TM signal at a lower frequency spacing that is approximately orthogonal to the non-TM signal.

In some implementations, the non-TM signal, the first TM signal, and the second TM signal have a same symbol frame rate.

In some implementations, the transmitter includes a field programmable gate array programed to perform the operations. In some implementations, the transmitter includes an application specific integrated circuit with circuitry configured to perform the operations.

In some implementations, the transmitter includes at least one processor, and a data store coupled to the at least one processor having instructions stored thereon which, when executed by the at least one processor, causes the at least one processor to perform the operations.

In a fifth aspect, the disclosure features methods of demodulating a carrier signal that include the operations of receiving a combined signal that includes a carrier signal modulated with a first transpositional modulation (TM) signal, a second TM signal, and a non-TM signal, where the first TM signal is positioned, in frequency, at an upper sideband in a frequency spectrum of the non-TM signal, and the second TM signal is positioned, in frequency, at a lower sideband in the frequency spectrum of the non-TM signal. Separating the first TM signal, the second TM signal, and the non-TM. Demodulating the non-TM signal. For each of the first TM signal and the second TM signal: shifting the TM signal to baseband, forming a vector of multiple symbol frames of the TM signal, and determining a value of a symbol of the TM signal based on a combination of the vector and a symbol coefficient matrix to demodulate the TM signal.

In a sixth aspect, the disclosure features methods of demodulating a carrier signal that include the operations of receiving a combined signal that includes a carrier signal modulated with a transpositional modulation (TM) signal, and a non-TM signal, where the TM signal is positioned, in frequency, at an upper or lower sideband in a frequency spectrum of the non-TM signal. Separating the TM signal and the non-TM. Demodulating the non-TM signal. Shifting the TM signal to baseband. Forming a vector of multiple symbol frames of the TM signal. Determining a value of a symbol of the TM signal based on a combination of the vector and a symbol coefficient matrix to demodulate the TM signal.

In a seventh aspect, the disclosure features methods of demodulating a carrier signal that include the operations of receiving a combined signal that includes a carrier signal modulated with a first transpositional modulation (TM) signal, a second TM signal, and a non-TM signal, where the first TM signal is positioned, in frequency, at an upper sideband in a frequency spectrum of the non-TM signal, and the second TM signal is positioned, in frequency, at a lower sideband in the frequency spectrum of the non-TM signal. Separating the first TM signal, the second TM signal, and the non-TM. Demodulating the non-TM signal. For each of the first TM signal and the second TM signal: forming a vector of multiple symbol frames of the TM signal, and determining a value of a symbol of the TM signal based on a combination of the vector and a symbol coefficient matrix to demodulate the TM signal.

In an eight aspect, the disclosure features a signal receiver configured to perform operations that include receiving a combined signal that includes a carrier signal modulated with a first transpositional modulation (TM) signal, a second TM signal, and a non-TM signal, where the first TM signal is positioned, in frequency, at an upper sideband in a frequency spectrum of the non-TM signal, and the second TM signal is positioned, in frequency, at a lower sideband in the frequency spectrum of the non-TM signal. Separating the first TM signal, the second TM signal, and the non-TM. Demodulating the non-TM signal. For each of the first TM signal and the second TM signal: shifting the TM signal to baseband, forming a vector of multiple symbol frames of the TM signal, and determining a value of a symbol of the TM signal based on a combination of the vector and a symbol coefficient matrix to demodulate the TM signal.

In a ninth aspect, the disclosure features a signal receiver configured to perform operations that include receiving a combined signal that includes a carrier signal modulated with a transpositional modulation (TM) signal, and a non-TM signal, where the TM signal is positioned, in frequency, at an upper or lower sideband in a frequency spectrum of the non-TM signal. Separating the TM signal and the non-TM. Demodulating the non-TM signal. Shifting the TM signal to baseband. Forming a vector of multiple symbol frames of the TM signal. Determining a value of a symbol of the TM signal based on a combination of the vector and a symbol coefficient matrix to demodulate the TM signal.

In a tenth aspect, the disclosure features a signal receiver configured to perform operations that include receiving a combined signal that includes a carrier signal modulated with a first transpositional modulation (TM) signal, a second TM signal, and a non-TM signal, where the first TM signal is positioned, in frequency, at an upper sideband in a frequency spectrum of the non-TM signal, and the second TM signal is positioned, in frequency, at a lower sideband in the frequency spectrum of the non-TM signal. Separating the first TM signal, the second TM signal, and the non-TM. Demodulating the non-TM signal. For each of the first TM signal and the second TM signal: forming a vector of multiple symbol frames of the TM signal, and determining a value of a symbol of the TM signal based on a combination of the vector and a symbol coefficient matrix to demodulate the TM signal.

In an eleventh aspect, the disclosure features methods of training a transpositional modulation (TM) receiver that include the operations of receiving a combined signal that includes a carrier signal modulated with a TM signal and a non-TM signal, the TM signal positioned, in frequency, at an upper or lower sideband in a frequency spectrum of the non-TM signal, where the TM signal contains training data.

Separating the TM signal and the non-TM signal. Shifting the TM signal to baseband. Arranging multiple frames of the TM signal into a received training data matrix. Determining a symbol coefficient matrix for the TM signal based on the received training data matrix and a known training data matrix.

In a twelfth aspect, the disclosure features a signal receiver configured to perform operations that include receiving a combined signal that includes a carrier signal modulated with a TM signal and a non-TM signal, the TM signal positioned, in frequency, at an upper or lower sideband in a frequency spectrum of the non-TM signal, where the TM signal contains training data. Separating the TM signal and the non-TM signal. Shifting the TM signal to baseband. Arranging multiple frames of the TM signal into a received training data matrix. Determining a symbol coefficient matrix for the TM signal based on the received training data matrix and a known training data matrix.

These and other implementations can each optionally include one or more of the following features.

In some implementations, separating the first TM signal, the second TM signal, and the non-TM signal includes separating the first TM signal, the second TM signal, and the non-TM signal using finite-impulse response (FIR) filtering.

In some implementations, determining a value of a symbol of the TM signal based on a combination of the vector and a symbol coefficient matrix includes: determining a dot-product of the vector with the symbol coefficient matrix to obtain the value of the symbol, and mapping the value of the symbol to a bit pattern represented by the value. In some implementations, the vector including at least six symbol frames of the TM signal.

In some implementations, separating the separating the first TM signal, the second TM signal, and the non-TM signal includes using finite impulse response (FIR) filters to separate the first TM signal, the second TM signal, and the non-TM signal.

In some implementations, determining the symbol coefficient matrix for the TM signal based on the received training data matrix and the known training data matrix includes: determining an inverse or pseudo-inverse of the received training data matrix based on a singular value decomposition (SVD) of the received training data matrix, and multiplying the pseudo-inverse of the received training data matrix with the known training data matrix to provide the symbol coefficient matrix. In some implementations, the received training data matrix includes at least six rows of N frames of the TM signal, where a first through N−1th frame of the second row are equal to a second through nth frame of the first row.

In some implementations, the receiver includes a field programmable gate array programed to perform the operations. In some implementations, the receiver includes an application specific integrated circuit with circuitry configured to perform the operations.

In some implementations, the receiver includes at least one processor, and a data store coupled to the at least one processor having instructions stored thereon which, when executed by the at least one processor, causes the at least one processor to perform the operations.

Particular implementations of the subject matter described in this specification can be implemented so as to realize one or more of the following advantages. Implementations may increase the data rate of signals transmitted using traditional modulation schemes. Implementations may permit the combination of two differently modulated signals on a single carrier frequency. Implementations may increase the data throughput of individual wired or wireless data links.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 17 depicts example matrix operations performed as part of the process depicted in FIG. 16.

Like reference numbers and designations in the various drawings indicate like elements.

DETAILED DESCRIPTION

Figure 1:
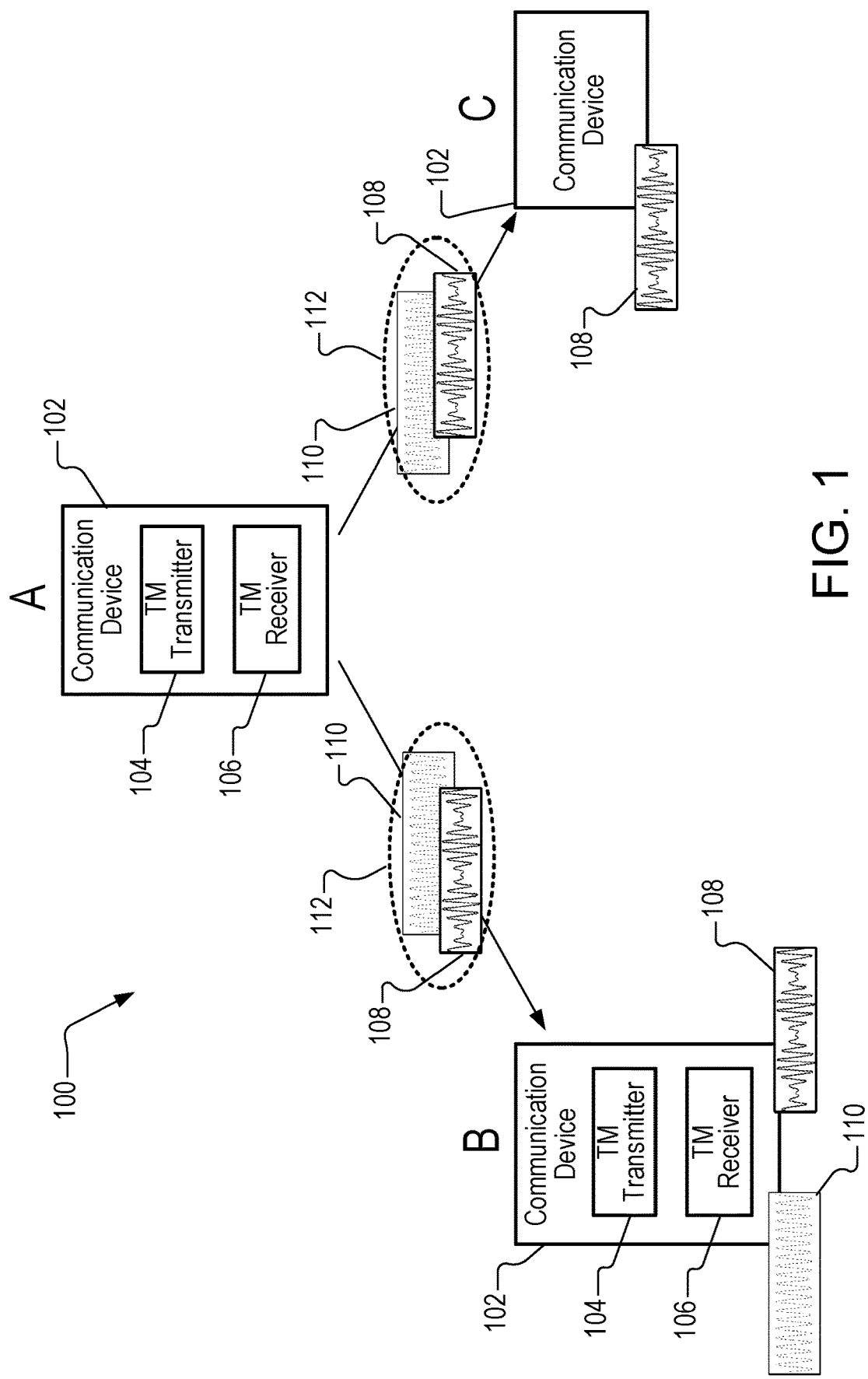
FIG. 1 depict example systems in accordance with implementations of the present disclosure.

Implementations of the present disclosure generally relate to conducting electronic communications using transpositional modulation (TM). More specifically, implementations relate to methods and systems for generating TM signals and methods and systems for demodulating TM signals.

As used herein the terms "Transpositional Modulation," "TM modulation," "TM," and "TM signal" refer to techniques of adding information to a carrier signal without affecting the amplitude, frequency or phase of the carrier signal (or a signal that is modulated according to such a technique) as observed by a traditional receiver or demodulator (e.g., a non-TM capable receiver/demodulator). Transpositional modulation can be generated by several techniques. For example, in a "wide-band TM modulation" technique information is conveyed by modulating the inflection points of a carrier wave to represent data. For example, in a "harmonic TM modulation" technique information is conveyed by altering (e.g., transposing, time shifting) a harmonic of a carrier signal. For example, Transpositional Modulation can be produced by altering a third harmonic or other harmonics of a carrier signal (e.g., a fourth harmonic, fifth harmonic, sixth harmonic, etc.). For example, in an "internal TM modulation" technique information is conveyed by altering a periodic signal (an "internal TM modulation signal") which is applied to the carrier signal. Any effects of the TM internal modulation signal on either the carrier wave itself or another traditional modulation signal (e.g., non-TM signal) carried by the carrier wave cancel over the symbol frame of a non-TM modulation signal, and consequently, are not detectable by a traditional signal demodulator. Examples of documents that describe techniques for performing TM modulation and demodulation and/or uses of transpositional modulation include, but are not limited to, U.S. Pat. No. 9,014,293 entitled "Transpositional modulation systems and methods;" U.S. Pat. No. 9,338,041 entitled "Extracting carrier signals from modulated signals;" U.S. Pat. No. 9,338,042 entitled "Separating and extracting modulated signals;" U.S. Pat. No. 9,473,983 entitled "Transpositional modulation communications between devices;" U.S. Pat. No. 9,515,815 entitled "Transpositional modulation systems, methods and devices;" U.S. Pat. No. 9,516,490 entitled "Identifying devices with transpositional modulation;" U.S. Pat. No. 9,628,318 entitled "TRANSPOSITIONAL MODULATION COMMUNICATIONS;" and U.S. Pat. No. 9,882,764 entitled "TRANSPOSITIONAL MODULATION." TM signals generated by each of the above techniques share the same characteristics in that the TM signals add information to a carrier signal without affecting the amplitude, frequency or phase of the carrier signal as observed by a traditional demodulator (e.g., non-TM demodulator) and the TM signals are not detectable by traditional demodulators, for example, those used for amplitude, frequency, or phase modulated signals. The present application introduces techniques for expanding the internal TM modulation technique to produce independent TM sidebands to a non-TM signal.

As used herein the term "transparency" as used in relation to TM modulation with respect to other non-TM modulated signals refers to the ability to add TM to another modulation signal, for example adding TM to a Quadrature Amplitude Modulation (QAM) baseband or subcarrier signal, without substantially adding observable bandwidth, while both the TM modulation and the non-TM modulation can be independently recovered.

FIG. 1 depicts an example system 100 in accordance with implementations of the present disclosure. The system 100 is a system of communication devices 102. The system 100 may be a radio frequency (RF) communication system, a satellite communication system, a landline communication system (e.g., a telephony or cable network), an optical communication system, a computer network, or any other system of communication devices 102. The communication devices 102 include systems for modulating a carrier signal with an information signal using traditional modulation techniques and transmitting and receiving the modulated signal from one communication device 102 to/from another. For example, communication device A may be a cellular base station, and communication devices B and C may be mobile devices (e.g., smartphones).

Communications devices A, B, and C include a traditional (e.g., non-TM) transmitter and receiver. Traditional modulation techniques include, for example, amplitude modulation (AM), frequency modulation (FM), and phase modulation (PM) in addition to complex modulation techniques that incorporate aspects of AM, FM, and PM such as quadrature phase shift keying (QPSK), amplitude phase shift keying (APSK) and including quadrature amplitude modulation (QAM). In addition, communication devices A and B include a TM transmitter 104 and a TM receiver 106. In some examples, a TM transmitter 104 and/or a TM receiver 106 can be integrated with traditional transmitters and receivers. The TM transmitter 104 and/or TM receiver 106 can be implemented as hardware devices (e.g., integrated circuits, chip-sets, application specific integrated circuits (ASIC) or field programmable logic arrays (FPGA)) or they can be implemented in software (e.g., as a software defined radio (SDR)).

The system 100 can combine non-TM (e.g., traditionally modulated) signals 108 with TM modulated signals 110 on the same carrier using a TM transmitter 104, thereby, increasing the overall data rate of the combined signal 112. The TM modulated signal 110 can be separated from the combined signal 112 and demodulated by a TM receiver 106. Likewise, the traditionally modulated signal 108 can be separately demodulated with no significant interference caused by the TM modulated signal 110. This is possible because TM modulated signals are undecipherable by non-TM receivers, instead appearing as a slight increase of noise in traditionally modulated signals.

For example, communication device A may transmit a combined signal 112 including a QAM signal 108 and a TM modulated signal 110 on the same carrier signal. Communication device B can then receive the combined signal 112. A non-TM receiver in communication device B is used to detect and demodulate the non-TM signal 108. The TM receiver 106 of communication device B separates and extracts the TM modulated signal 110 from the combined signal 112, and then demodulates the TM modulated signal 110 to obtain the TM modulated data signal. On the other hand, communication device C, which does not have a TM receiver 106, will only detect and demodulate the traditionally modulated signal 108; not the TM modulated signal 110.

In some implementations, the carrier signal can be an intermediate frequency (IF) carrier signal. That is, the carrier signal is not necessarily at the same frequency of the carrier upon which the signal is ultimately be transmitted, but may be at an IF used internally within a system (e.g., a satellite communication system) as an intermediate step in either signal transmission or reception. That is, in the case of signal transmission, a system may up-convert a combined signal 112 from the IF signal to a transmission carrier frequency prior to transmitting the combined signal 112. Conversely, in the case of signal reception, a system may down-convert a modulated signal from the transmission carrier frequency to an IF frequency before separating the TM modulated signal 110 from the combined signal 112. In other implementations, an IF carrier signal may not be used, and the transmission carrier signal can be modulated with both a traditionally modulated signal and a TM modulated signal.

Electronic communications between communication devices A, B, and C can be performed through wired communication channels, wireless communication channels, or both. For example, communication devices 102 can be configured with one or more antennae to conduct wireless communications through a wireless channel including, but not limited to, a satellite communication channel, a wireless computer networking communication channel, and a cellular communication channel. Communication device 102 can be configured to conduct communication through a wired communication channel including, but not limited to, a telephone network, cable networks, an Ethernet network, or serial communication channels (e.g., USB, Thunderbolt, etc.). Communication devices 102 can include, but are not limited to, cellular base stations, mobile communication devices (e.g., mobile phones, smartphones, tablet computers, wearable devices), satellite bases stations, satellite radios, computer network devices (e.g., servers, routers, wireless network access points or wireless network routers), computers (e.g., laptop or desktop computers), Internet of Things (IoT) devices, computer peripheral devices (e.g., plug and play devices), near-field communication transceivers, broadcast and/or cablecast network devices (e.g., cable television receivers), broadband/cable modems, communication devices autonomous vehicle communications (e.g., self-driving vehicles, unmanned aerial vehicles (UAV)), etc.

Figure 2:
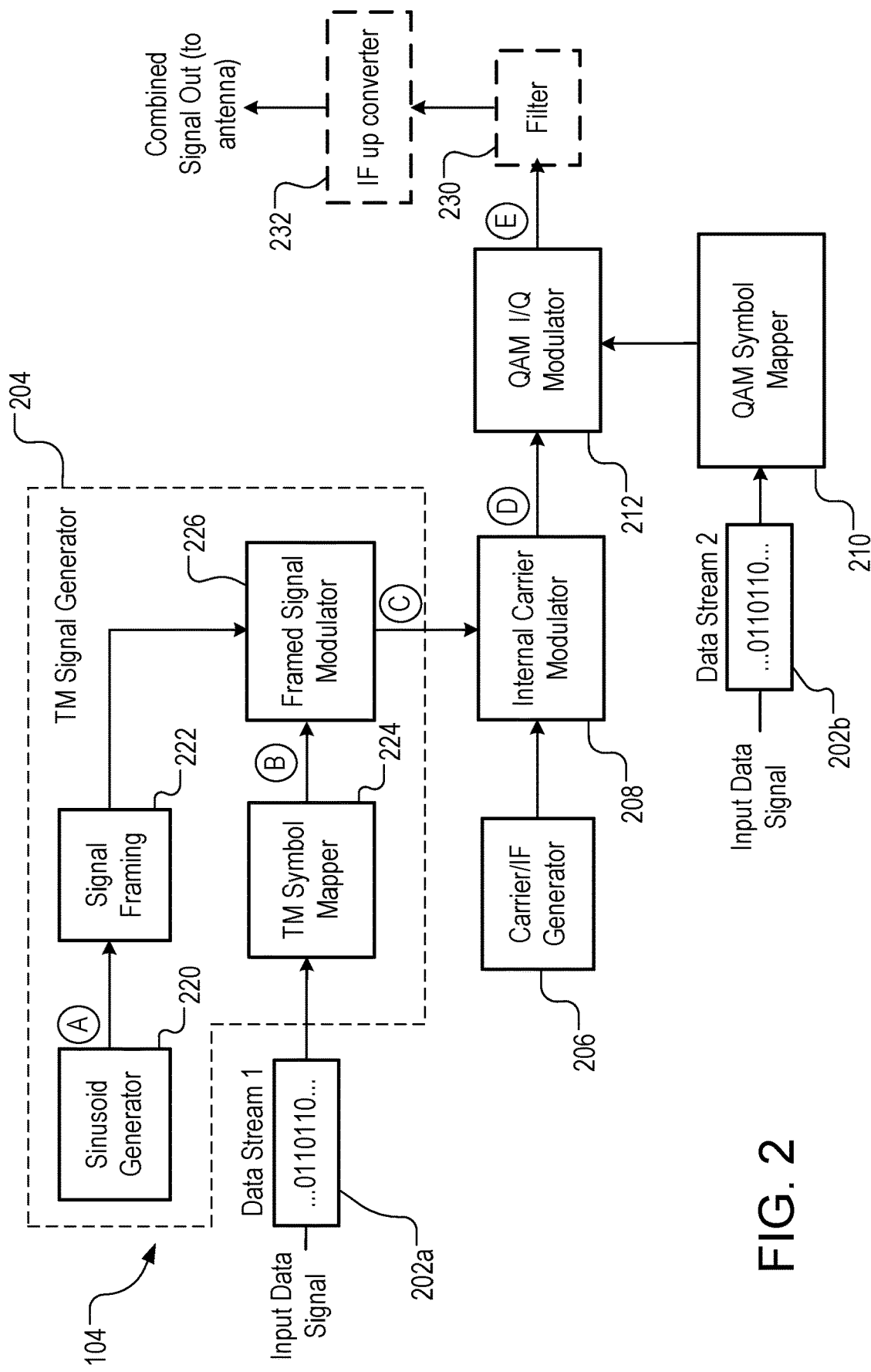
FIG. 2 depicts a block diagram of a representative TM signal transmitter in accordance with implementations of the present disclosure.

FIG. 2 depicts a block diagram of a representative TM signal transmitter 104 in accordance with implementations of the present disclosure. TM transmitter 104 is an integrated TM transmitter. That is, TM transmitter 104 is integrated with non-TM transmitter components. TM transmitter 104 can be implemented in hardware (e.g., as integrated circuits, chip-sets, application specific integrated circuits (ASIC) or field programmable logic arrays (FPGA)) or in software (e.g., as a software defined radio (SDR)). TM transmitter 104 includes several component modules which are described in more detail below.

For simplicity of discussion, TM transmitter 104 is illustrated and described in the context of combining a TM signal with a QAM signal. However, TM transmitter 104 may be configured to combine TM with other non-TM modulation types including, but not limited to, AM, FM, PM, QPSK, APSK, DPSK, or FSK. That is, for example, in some implementations, QAM components 210 and 212 may be replaced by or supplemented with corresponding modulation components for performing PSK modulation. In some implementation, for example, TM transmitter 104 can include multiple sets of non-TM modulation components. TM transmitter 104 can configured to select between combining TM signals with any of the configured non-TM types of modulation. For example, a processor can be used to select between several non-TM signal types for combination with a TM signal based criteria including, but not limited to, communication channel conditions (e.g., noise, error rate, etc.), capabilities of a receiving device (e.g., which non-TM signals a receiver is capable of receiving), a priority of the data to be sent, a size of the data to be sent or a type of the data to be sent.

As a whole, TM transmitter 104 receives multiple input data signals and processes the data signals for transmission on a common carrier using both a TM signal and a non-TM signal. TM transmitter 104 receives input data signals 202a, 202b (data stream 1 and data stream 2). The input data signals 202a, and 202b are intended for transmission to one or more receivers. In the illustrated implementation, TM transmitter 104 modulates a carrier signal with data from data stream 1 using TM modulation and modulates the same carrier with data from data stream 2 using QAM modulation. Data stream 1 and data stream 2 can be two independent data streams. TM transmitter 104 may thus increase the data throughput of system by sending two data signal on the same carrier. Thus, TM transmitter 104 may provide, in a sense, modulation division multiple access by separately transmitting two independent data signals 202a, 202b simultaneously on a single carrier using separate TM and QAM signals.

TM transmitter 104 uses a technique referred to herein as "internal TM modulation" to generate the TM signal. As will be described in more detail below, internal TM modulation involves encoding data from an input data stream 202a within discrete phase shifts or time shifts of an internal modulation signal (also referred to as an "internal TM signal" or simply the "TM signal" in reference to internal TM modulation). The internal TM signal is periodic signal, for example, a sinusoid or other periodic signal. The internal TM signal has a frequency that is related to the symbol frame (e.g., symbol period and symbol rate) of the non-TM signal with which the TM signal will be combined. For example, the internal TM signal can have a frequency that is an integer multiple of the symbol rate of the non-TM signal.

TM transmitter 104 modulates a carrier signal with the TM signal by applying the internal TM signal to the carrier signal. Internal TM modulation differs from traditional phase modulation in that the phase of the carrier signal is not directly modulated or altered based on the input data signal. Instead, the internal TM signal is modulated with the data signal and the entire sinusoidal internal TM signal is applied to the carrier by, for example, inserting the entire sinusoidal internal TM signal into the phase or frequency of the carrier signal. The data of the data signal 202a is encoded in a phase or time shift of the internal TM signal and not directly in the carrier. Moreover, because the internal TM signal is periodic, variations in the phase of the carrier caused by the internal TM signal are averaged out over an integer number cycles of the internal TM signal (discussed in more detail below in reference to FIGS. 3B and 6). In some implementations, TM symbols can be constructed so that the internal TM signal averages out over an integer number of half-cycle of the internal TM signal.

In more detail, TM transmitter 104 includes several modules, each of which can be implemented in hardware or software. For example, each of the modules can be implemented in hardware as an integrated circuit, a chip-set, an ASIC, FPGA, as a software module (e.g. one or more code blocks), or a combination thereof. TM transmitter 104 includes a TM signal generator (TM-SG) 204, a carrier generator 206, an internal carrier modulator 208, a QAM symbol mapper 210, and a QAM I/Q modulator 212.

TM-SG 204 generates the internal modulation signal. The TM-SG 204 includes a signal generator 220, a signal framing module 222, a TM symbol mapper 224, and a framed signal modulator 226. Signal generator 220 generates a periodic signal which will be modulated to provide the internal modulation signal. For example, signal generator 220 is described herein as generating a sinusoidal signal. However, in other implementations, different periodic signals can be used to produce the internal modulation signal as described herein.

Figure 3A:
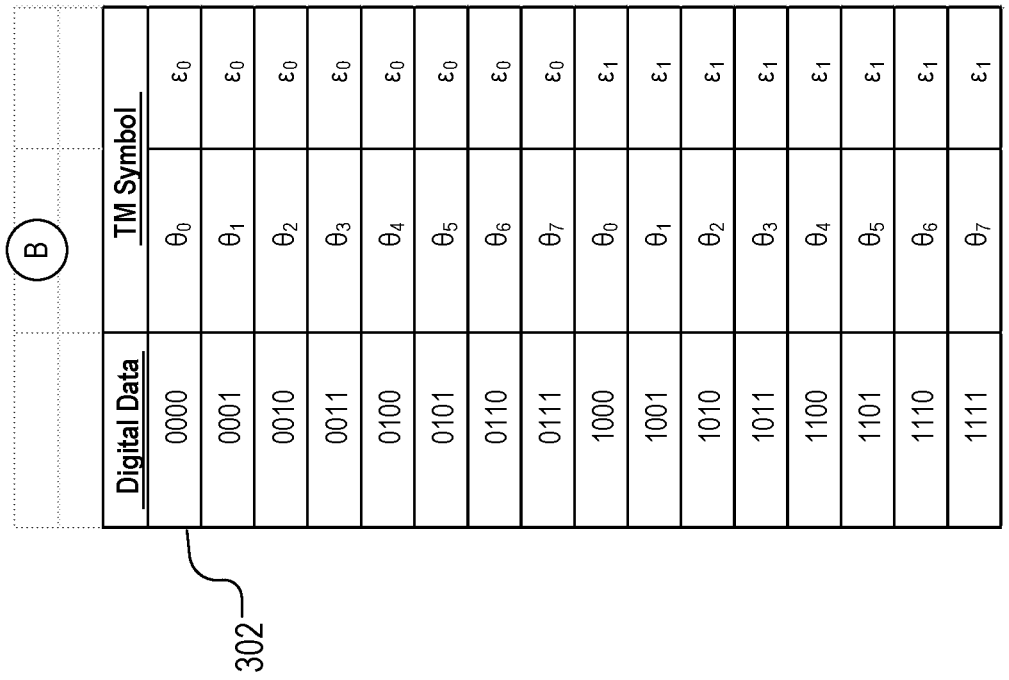
FIG. 3A depicts charts of exemplary symbol maps for TM symbols in accordance with implementations of the present disclosure.
Figure 3B:
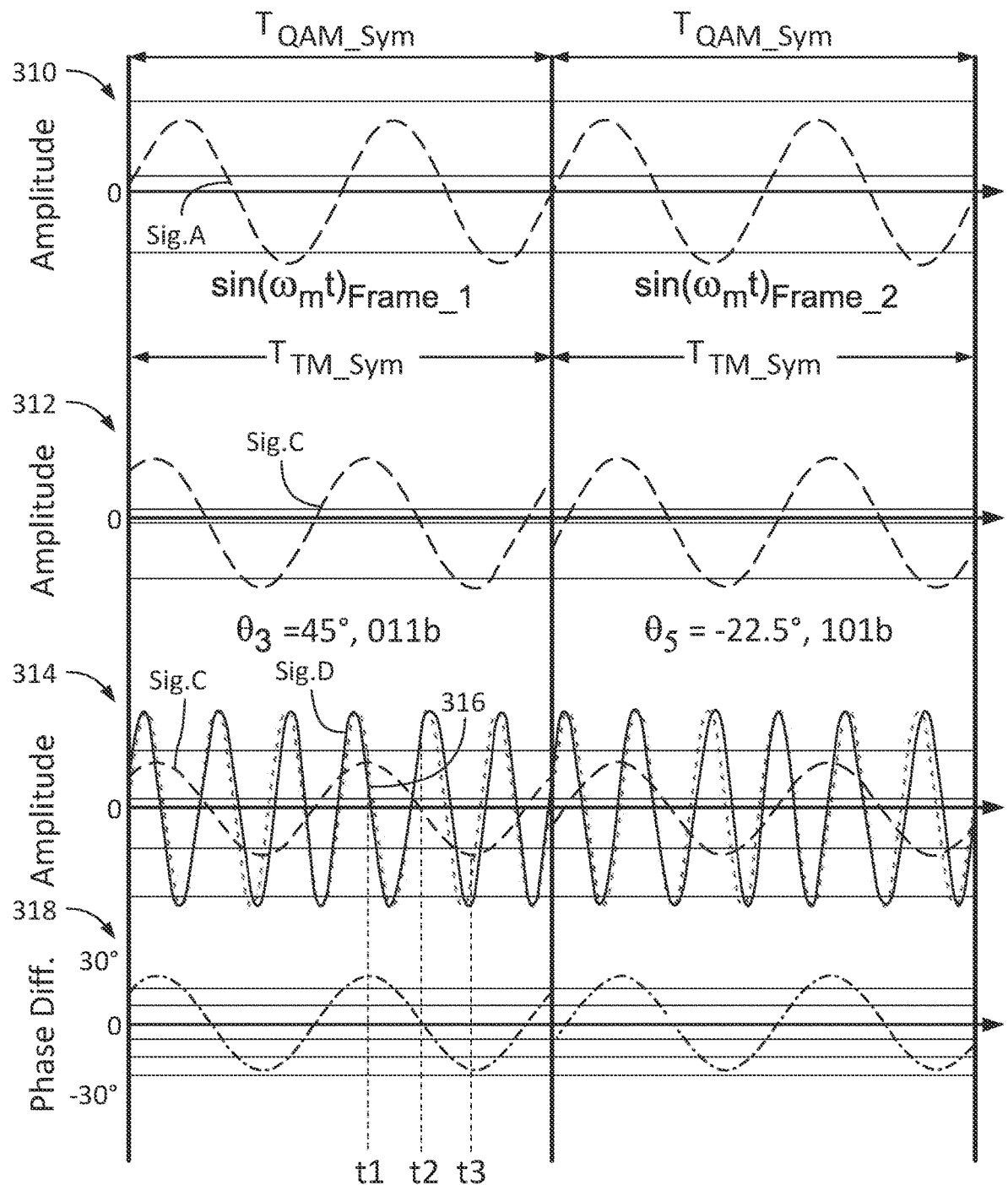
FIGS. 3B-3G depicts graphs of representative signals produced at various stages within the TM transmitter of FIG. 2.

The sinusoidal signal can be represented generally as $\sin(\omega_m t)$, where $\omega_m = 2\pi f$. The frequency, f, of the sinusoidal signal is related to the symbol rate of the QAM signal which the TM signal will be combined. A representative output (signal A) of signal generator 220 is illustrated in graph 310 of FIG. 3B. For example, the frequency of the sinusoidal signal (signal A) can be, approximately, an integer multiple of the symbol rate of the QAM symbols generated by the QAM symbol mapper 210 and QAM I/Q modulator 212. Thus, an integer number of cycles of the sinusoidal signal (signal A) are present each QAM symbol period ($T_{QAM\_Sym}$). For example, as shown in FIG. 3B, approximately two cycles of the sinusoidal signal (signal A) are present in each QAM symbol period (e.g., the frequency of the Signal A in FIG. 3B is approximately twice the QAM symbol rate).

Signal framing module 222 divides the sinusoidal signal into frames. The frames of the sinusoidal signal represent portions of the sinusoidal that will be discretely phase or time shifted to generate the internal TM modulation signal. The framed portions of the sinusoidal signal also represent the symbol period of TM symbols ($T_{TM\_Sym}$). For example, graph 310 of FIG. 3B illustrates signal A separated into frames. The framed signal can be represented by $\sin(\omega_m t)_{Frame}$, where $\sin(\omega_m t)_{Frame} = \sin(\omega_m t)$; from the start of a frame $t=t_{F\_start}$ to the end of a frame $t=t_{F\_end}$. Signal framing module 222 can synchronize the framing of the sinusoidal signal such that each frame includes an integer number of cycles of the sinusoidal signal. In other words, signal framing module 222 times the frames such that the TM symbol period corresponds with an integer multiple of the period of the sinusoidal signal generated by signal generator 220. Graph 310 of FIG. 3B illustrates frame 1 and frame 2 as including two cycles of sinusoidal signal A. The TM symbol periods may include any integer number of cycles of the sinusoidal signal. Moreover, as described below and illustrated in FIGS. 3D and 3E, the TM symbol frames need not be the same length as the QAM symbol periods (as shown in FIG. 3B). The TM symbol frames may be shorter or longer than the QAM symbol periods.

TM symbol mapper 224 maps the data from input data 202a to TM symbols of a TM symbol constellation. The TM symbols can be represented by different discrete phase shifts in each frame of the sinusoidal signal generated by signal generator 220. For example, the output (Signal B) of TM symbol mapper 224 is a phase shift value ($\theta_i$) that represents the value of a set of binary digits. FIG. 3A depicts a chart 300 of an exemplary symbol map for TM symbols. Chart 300 shows a mapping of eight three-bit TM symbols. Each three-bit set of binary data corresponds to a discrete phase shift (e.g., $\theta_0-\theta_7$) of the sinusoidal signal (e.g., signal A). The illustrated TM symbol constellation is an 8-TM constellation; similar to an 8-PSK constellation. Although an 8-TM constellation size is shown, implementations can use N-ary TM constellation sizes that are larger or smaller than 8 symbols. For example, TM constellation sizes include 4-TM, 16-TM, 64-TM, 256-TM, or larger. The difference between phases $\theta_0-\theta_7$ represents the symbol spacing ($\Delta\theta$) for the TM constellation. The total range for the phase shifts (e.g., symbol space) can be from $\pi$ to $-(\pi-\Delta\theta)$.

Framed signal modulator 226 generates the internal modulation signal (e.g., TM signal). Framed signal modulator 226 modulates the sinusoidal signal (signal A) by applying an appropriate phase shift to each frame of the sinusoidal signal to represent data from the input data signal 202a. For example, framed signal modulator 226 receives phase shift data from TM symbol mapper 224 and shifts the phase of a respective frame of the sinusoidal signal by a corresponding amount to accurately represent data from the input data signal 202a. The output of framed signal modulator 226 (signal C) is the internal TM signal.

For example, graph 312 of FIG. 3B illustrates a representative internal TM signal (signal C). Signal C is shown directly below the unmodulated sinusoidal signal (signal A) to clearly illustrate the discrete phase shifts in signal C. The first TM symbol (frame 1 of signal C) is shifted by 45° to represent the binary value 011b. The second TM symbol (frame 2 of signal C) is shifted by −22.5° to represent the binary value 101b. As seen in signal C, because the TM symbol period is an integer multiple of the period of signal A, the average value of signal C during each frame remains zero.

Each frame of the internal TM signal can be represented generally as $\Phi_{TM}(t)=\varepsilon \sin(\omega_m t+\theta_k)$, where $\Phi_{TM}(t)$ represents the internal TM signal, $\theta_k$ represents the phase shift of the k-th frame TM symbol, and $\varepsilon$ is a TM modulation index. The TM modulation index, $\varepsilon$, is set to a maximum value of less than $\pi$ (e.g., $\pi/2$) to avoid over modulation of the carrier's phase. Furthermore, the modulation index, phase shift values $\theta_k$, or both can be adjusted to control side lobes of the TM modulation when applied to the carrier signal. For example, the modulation index can be adjusted to control the spectrum of the TM signal such that it fits within a passband of a given communication channel. An internal TM signal that includes a set of N symbol frames can be represented generally as a sum of the N frames of TM symbols from k=0 to N; $\Phi_{TM}(t)=\Sigma_{k=0}^{N}[\varepsilon \sin(\omega_m t+\theta_k)]_{Frame\_k}$.

Internal carrier modulator 208 applies the internal TM signal to the carrier signal by inserting the internal TM signal into the phase of a carrier signal. Internal carrier modulator 208 receives a carrier signal from carrier generator 206. Carrier generator 206 produces a carrier or IF signal that will be used to transmit the TM signal and the QAM signal. The carrier signal is represented generally as A $\sin(\omega_c t)$, where A represents the amplitude of the carrier and $\omega_c$ represents the angular frequency of the carrier. Internal carrier modulator 208 inserts the internal TM signal into the phase of the carrier signal and outputs a TM modulated carrier signal (signal D). For example, the TM modulated carrier signal can be represented generally as $V_{TM}(t)=A \sin(\omega_c t+\Phi_{TM}(t))$. In some implementations, the internal TM signal can be inserted into the frequency of the carrier signal. For example, internal carrier modulator 208 can insert the internal TM signal into the frequency of the carrier signal. In such implementations, the TM modulated carrier signal can be represented generally as $V_{TM}(t)=A \sin((\omega_c+\Phi_{TM}(t))t)$.

In some implementations, such as when the TM signal is combined with a QAM signal the carrier is a complex carrier. In such implementations, the TM modulated carrier can be represented generally as $V_{TM}(t)=A\ e^{(i\omega_c t+\Phi_{TM}(t))}$. In practice, a complex carrier signal may be generated as a pair of real sinusoidal signals with an orthogonal phase relationship; an in-phase cosine carrier and a quadrature-phase negative cosine carrier). In such implementations, internal carrier modulator 208 inserts the internal TM signal into the phase of one or both of the I/Q carrier signals.

Graph 314 of FIG. 3B provides an example of a TM modulated carrier signal (signal D). For illustrative purposes, an unmodulated carrier signal 316 and internal TM signal (signal C) are superimposed over TM modulated carrier signal (signal D). In addition, graph 318, just below graph 314, is a plot of the time varying phase difference between the TM modulated carrier signal (signal D) and the unmodulated carrier signal 316. As illustrated in graphs 314 and 318, the TM modulated carrier signal (signal D) alternates between leading the unmodulated carrier signal 316 (at time $t_1$), being in completely phase with the unmodulated carrier signal 316 (at time $t_2$), and lagging the unmodulated carrier signal 316 (at time $t_3$) by equivalent phase shifts. This occurs twice within each QAM symbol period in the illustrated example. Consequently, the time-averaged phase difference between the TM modulated carrier signal (signal D) and the unmodulated carrier signal 316 is zero for each QAM symbol period.

Figure 3C:
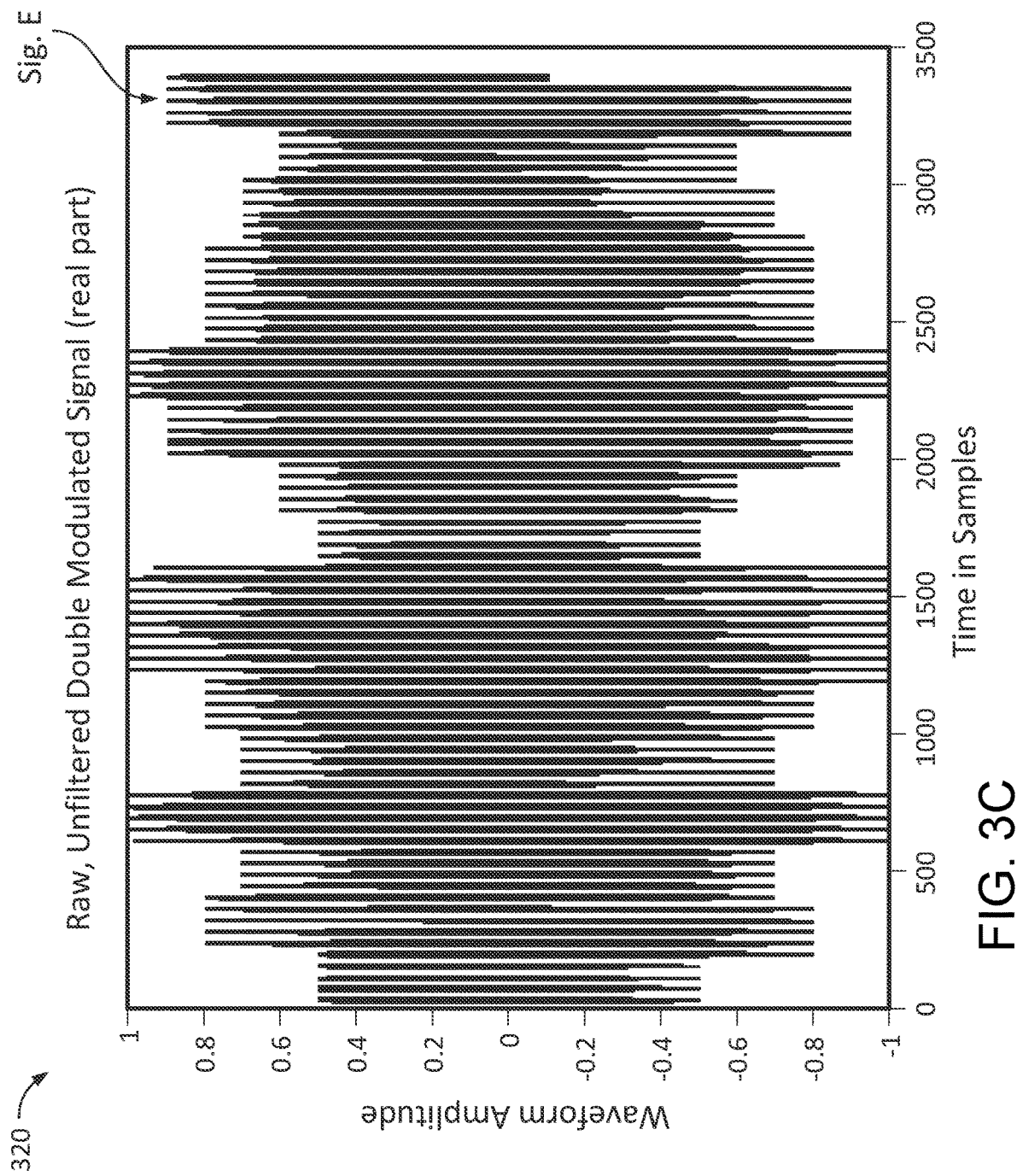

QAM symbol mapper 210 receives input data 202b from data stream 2 and maps the input data 202b to QAM symbols. QAM symbol mapper 210 outputs a baseband QAM signal that can be represented generally as $Q(t)=|Q_n|e^{i\Psi_n}$, where $|Q_n|$ represents the magnitude of the n-th frame QAM symbol and $e^{i\Psi_n}$ represents the phase of the n-th frame QAM symbol. QAM carrier modulator 212 modulates the TM modulated carrier signal (signal D) with the QAM symbols. QAM modulator 212 outputs a combined signal (signal E) that includes the carrier signal modulated with both the TM and QAM signals. The combined signal can be represented generally as $V_{comb.}(t)=Q(t) A\, e^{(i\omega_c t+\Phi_{TM}(t))}$. The combined signal ($V_{comb.}$) has a constant complex value over a QAM symbol frame, which is representative of one of N such values in a QAM constellation, as selected by QAM symbol mapper 210. Graph 320 of FIG. 3C provides an example of a combined TM and QAM modulated carrier signal (signal E). Graph 320 shows the real magnitude of a combined TM and QAM modulated carrier signal. As discussed above, phase shifts of the carrier due to the internal TM signal are canceled over the symbol period of the QAM signal, and thus, have a minimal impact on the recoverability of the QAM signal.

Filter 230 is a transmit filter that filters the combined signal to meet the constraints of a given transmission channel. For example, filter 230 can be a band pass filter that matches the pass-band of the transmission channel.

IF up converter 232 is included in transmitters 104 that generate the combine signal at an intermediate frequency. IF up converter 232 upshifts the combined signal from the intermediate frequency to a carrier frequency.

While transmitter 104 has been described as modulating a carrier signal with TM first and then modulating the TM modulated carrier with QAM, in some implementations the order of modulation may be reversed. For example, a carrier signal can be modulated with QAM first and the QAM modulated carrier can be subsequently modulated with the internal TM signal. That is the internal carrier modulator 208 can insert the internal TM signal into the phase of a complex carrier that is already modulated with a QAM signal.

As noted above, the TM symbol frame need not be the same length as the QAM symbol periods (as shown in FIG. 3B). In other words, the TM and QAM symbol rates can be different. In general, when the frequency of sinusoidal signal used to generate the internal TM signal is related to the QAM symbol rate (e.g., as opposed to being a harmonic of the carrier signal as noted above), then the TM symbol period should generally be an integer multiple of the period of the sinusoidal signal. Setting the TM symbol period as an integer multiple of the period of the sinusoidal signal aids in preventing interference between the TM and QAM signal and, thereby, maintaining the transparency between the signals.

Figure 3D:
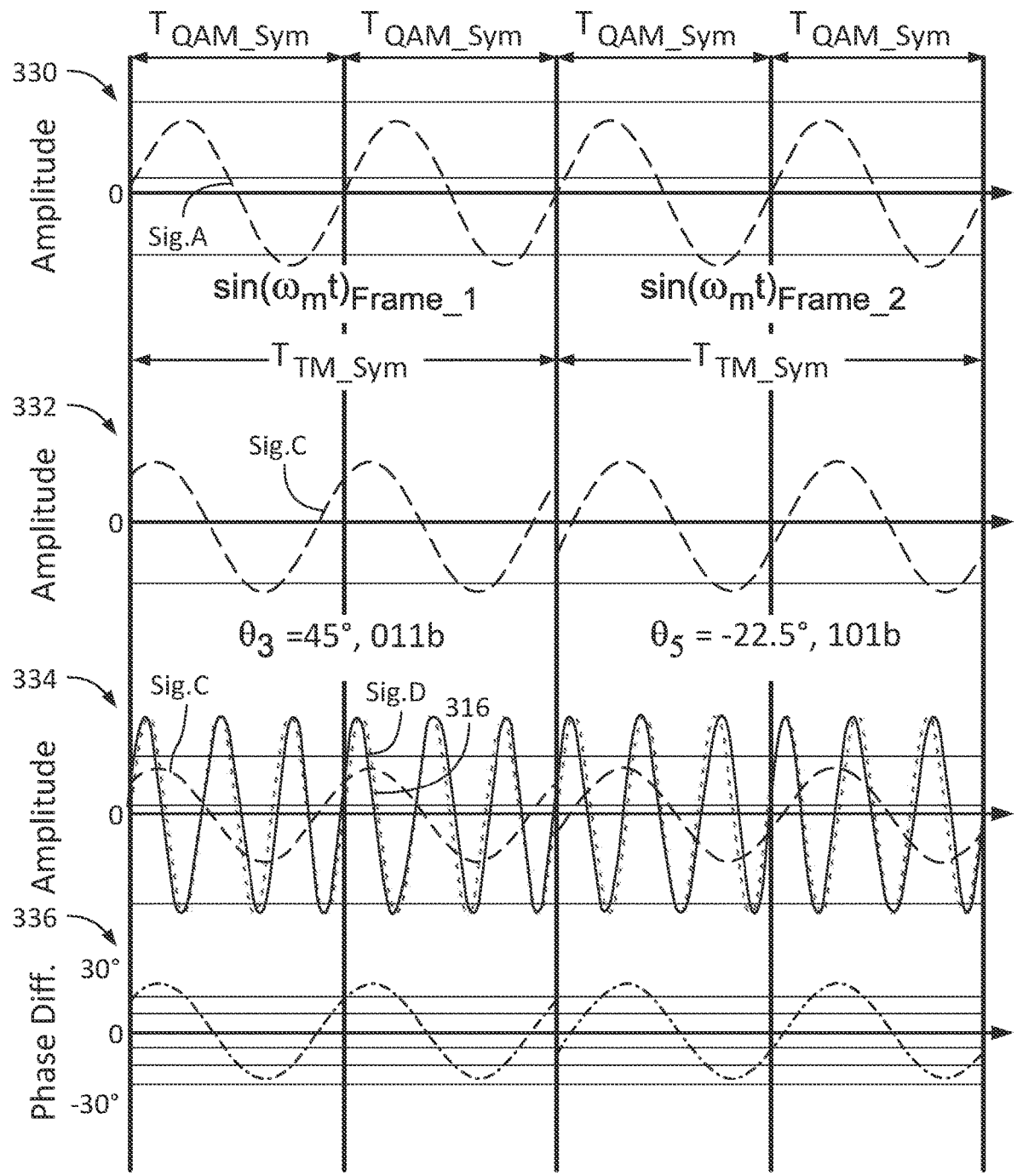

For example, FIG. 3D shows graphs 330-336 which illustrate a TM signal in which the TM symbol period is longer than the QAM symbol period, or, in other words, the TM symbol rate is lower than the QAM symbol rate. Graph 330 illustrates that the sinusoidal signal (signal A) has one cycle per QAM symbol. The TM symbol frames 1 and 2 of the internal TM signal (signal C) are twice the length of the QAM symbols, and thus, half of the symbol rate. Yet, as illustrated in graphs 334 and 336 the phase variations introduced into the TM modulated carrier signal (signal D) will still average to zero over each of the QAM symbol periods.

Figure 3E:
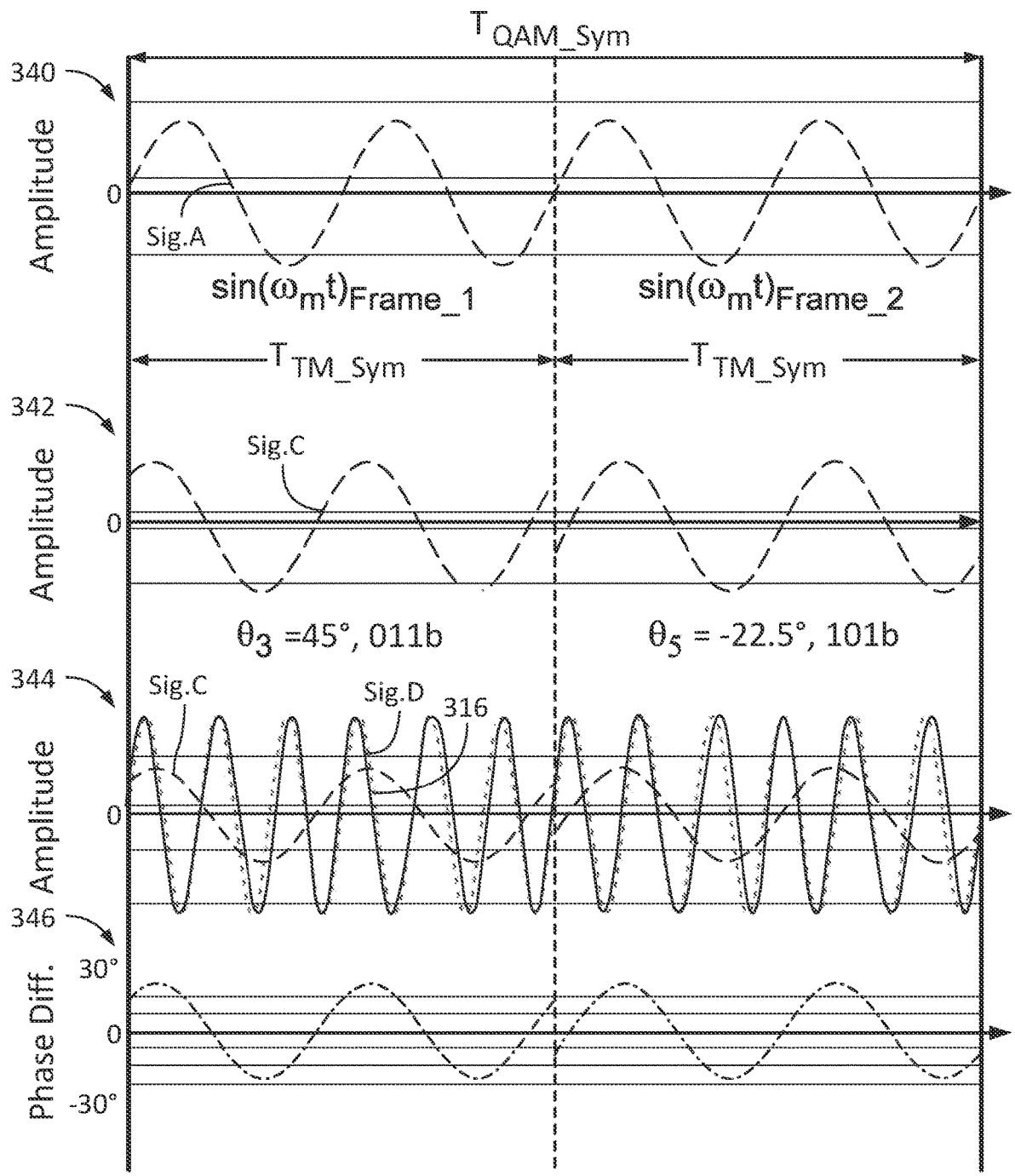

As another, FIG. 3E shows graphs 340-346 which illustrate a TM signal in which the TM symbol period is shorter than the QAM symbol period, or, in other words, the TM symbol rate is higher than the QAM symbol rate. Graph 340 illustrates that the sinusoidal signal (signal A) has four cycles per QAM symbol. The TM symbol frames 1 and 2 of the internal TM signal (signal C) are half the length of the QAM symbols, and thus, twice the symbol rate. Still, as illustrated in graphs 344 and 346 the phase variations introduced into the TM modulated carrier signal (signal D) will still average to zero over each of the QAM symbol periods.

In some implementations, the information carrying capacity of the TM signal can be increased by encoding data in amplitude shifts of the internal TM signal in addition to phase shifts. For instance, the internal TM signal can be itself a complex modulation signal (e.g., a "TM-QAM signal"). TM symbol mapper 224 can represent TM symbols by different combinations of a phase shifts and amplitude shifts of the sinusoidal signal generated by signal generator 220, thus, expanding the TM symbol constellation. For example, the TM modulation index, $\varepsilon$, can be shifted to add an amplitude shift component to the TM symbol set. Chart 302 of FIG. 3A illustrates an example set of TM symbols that incorporate both amplitude and phase shifts to represent data. In chart 302 $\varepsilon_0$ and $\varepsilon_1$ represent two amplitude levels (e.g., $\pi/6$ and $\pi/12$). Framed signal modulator 226 then modulates the sinusoidal signal (signal A) by applying an appropriate combination of phase shift and amplitude shift to each frame of the sinusoidal signal to represent data from the input data signal 202a and to, thereby, generate the internal TM signal (signal C). Each frame of the internal TM signal can be represented generally $\Phi_{TM}(t)=\varepsilon_k \sin(\omega_m t+\theta_k)$s, where $\varepsilon_k$ represents the amplitude shifted modulation index for the k-th frame TM symbol.

Figure 3F:
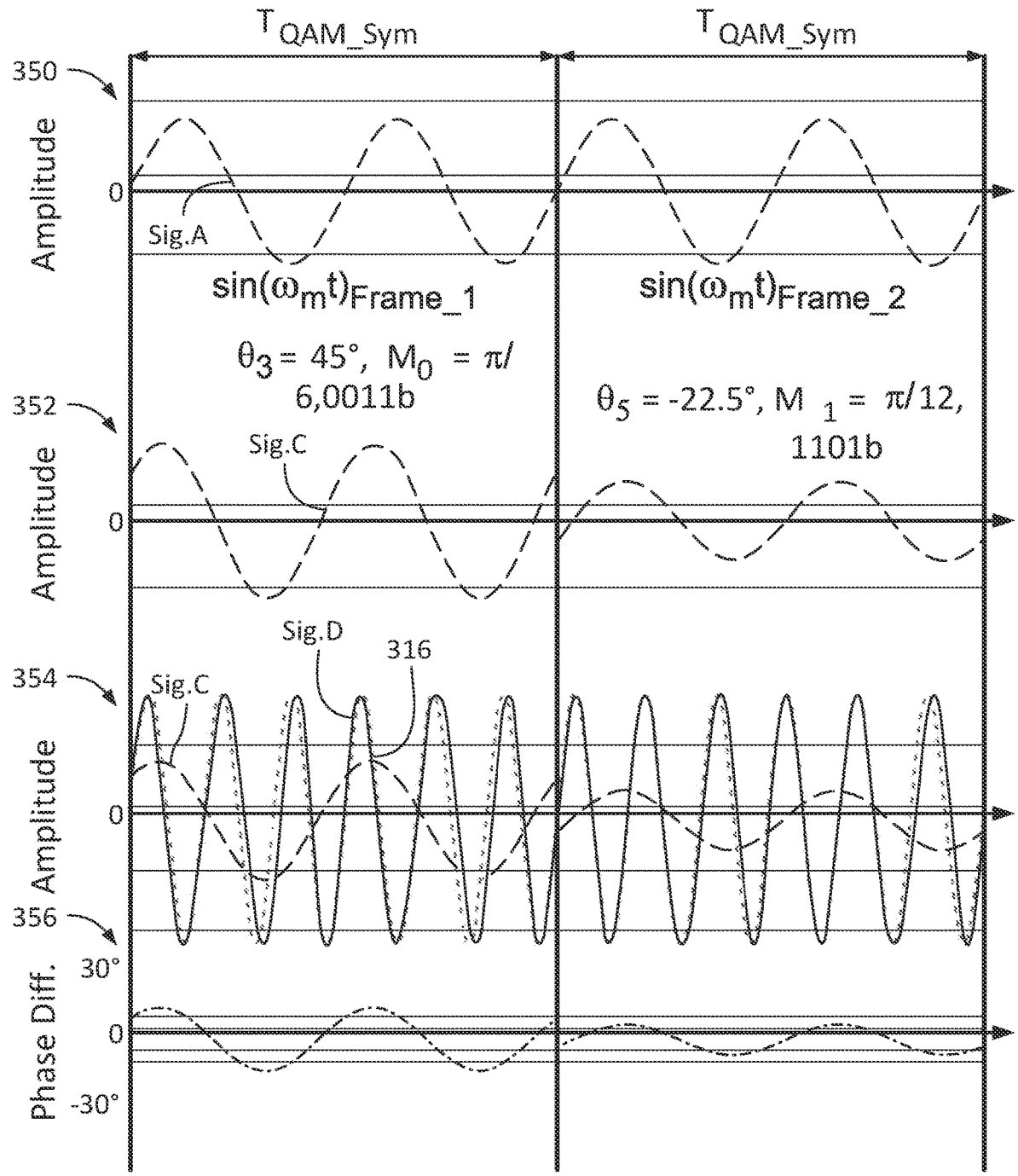

For example, FIG. 3F shows graphs 350-356 which illustrate a TM signal in which the TM symbols are represented by a combination of shifts in phase and amplitude (e.g., TM modulation index). Graph 350 illustrates that the sinusoidal signal (signal A) has two cycles per QAM symbol. As shown in graph 352, the first TM symbol (frame 1 of signal C) is represented by a phase shift by 45° of the sinusoidal signal (signal A) and a modulation index value of $\pi/6$ to represent the binary value 0011b. The second TM symbol (frame 2 of signal C) is represented by a phase shift by −22.5° of the sinusoidal signal (signal A) and a modulation index value of $\pi/12$ to represent the binary value 1101b. Yet, as illustrated in graphs 354 and 356 the phase variations introduced into the TM modulated carrier signal (signal D) will still average to zero over each of the QAM symbol periods. However, due to the smaller modulation index value of the second TM symbol, the TM modulated carrier signal (signal D) in frame 2 exhibits less phase variation.

Figure 3G:
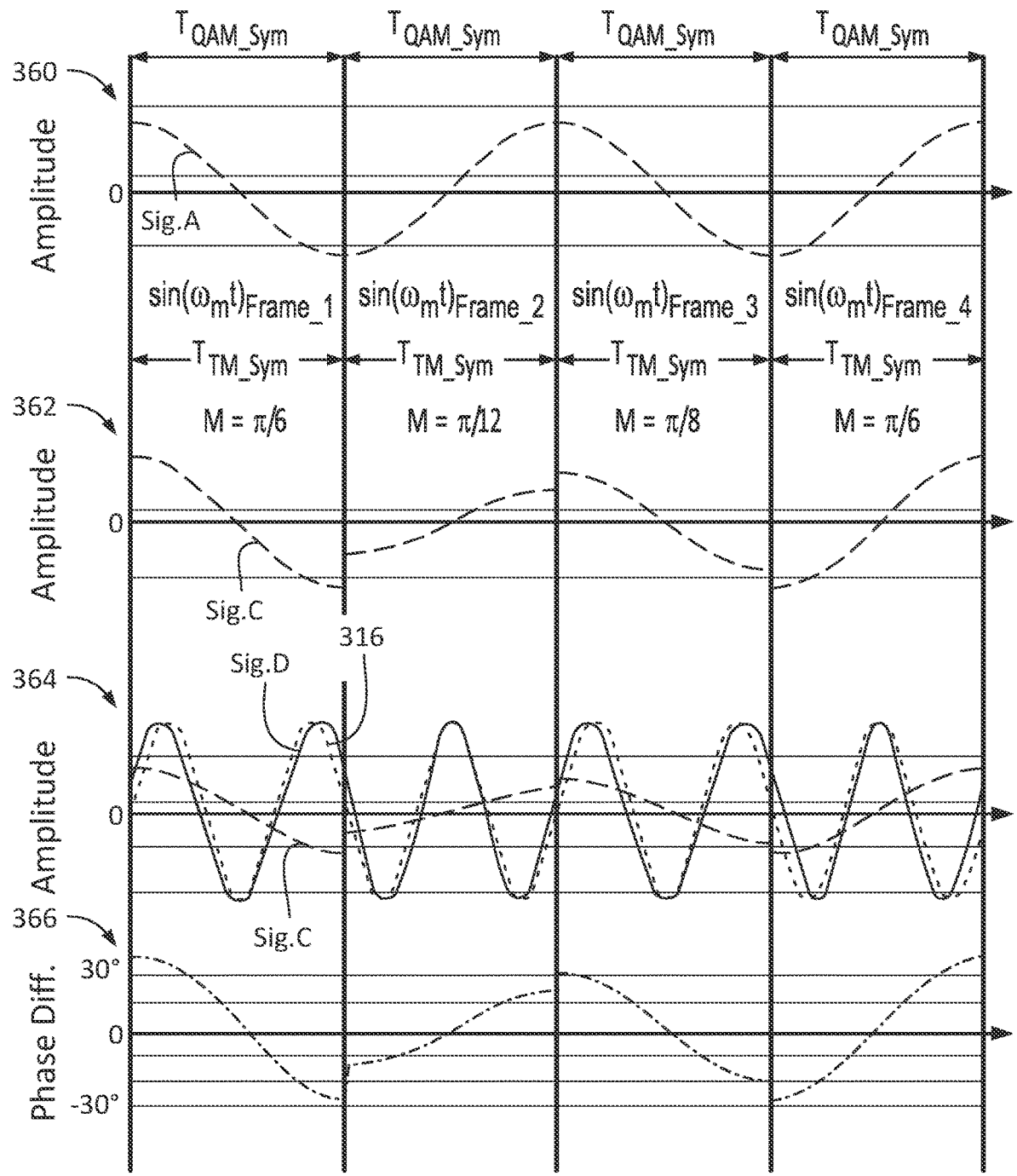

In some implementations, TM symbols can be represented by half-cycles of the sinusoidal signal (signal A). For example, a half-cycle TM symbol can be constructed so as to average to zero within each non-TM symbol frame by synchronizing the sinusoidal signal with the non-TM symbol frames such that the non-TM symbol frame includes approximately equal positive and negative quarter cycles of the sinusoidal signal. For example, a cosine signal that is synchronized with the non-TM symbol frames can be used as the sinusoidal signal (signal A), as illustrated in FIG. 3G. In such implementations, data can be encoded in the amplitude shifts of the internal TM signal. TM symbol mapper 224 can represent TM symbols by different combinations amplitude shifts of the sinusoidal signal generated by signal generator 220. For example, the TM modulation index, ε, can be shifted to encode data in an amplitude shift of the internal TM signal. Framed signal modulator 226 then modulates the sinusoidal signal (signal A) by applying an appropriate amplitude shift to each frame of the sinusoidal signal to represent data from the input data signal 202a and to, thereby, generate the internal TM signal (signal C). Each frame of the internal TM signal can be represented generally as $\Phi_{TM}(t)=\varepsilon_k \cos(\omega_m t)$, where $\varepsilon_k$ represents the amplitude shifted modulation index for the k-th frame TM symbol.

For example, FIG. 3G shows graphs 360-366 which illustrate a TM signal in which the TM symbols are represented by amplitude (e.g., TM modulation index) shifts in half-cycles of the sinusoidal signal. Graph 360 illustrates that the sinusoidal signal (signal A) has one half-cycle per QAM symbol. Graph 360 also illustrates the sinusoidal signal divided into four TM symbols (TM frames 1-4), each of which includes one half-cycle of the sinusoidal signal (signal A). As shown in graph 362, the first TM symbol (frame 1 of signal C) is represented by an amplitude modulation index value of π/6. The second TM symbol (frame 2 of signal C) is represented by an amplitude modulation index value of π/12. The third TM symbol (frame 3 of signal C) is represented by an amplitude modulation index value of π/8. And, the fourth TM symbol (frame 4 of signal C) is represented by an amplitude modulation index value of π/6. Yet, as illustrated in graphs 364 and 366 the phase variations introduced into the TM modulated carrier signal (signal D) will still average to zero over each of the QAM symbol periods. The effect of the positive quarter-cycle of each TM symbol on the TM modulated carrier signal (signal D) effectively cancels with corresponding negative quarter-cycle.

FIG. 3G serves as an example of how an internal TM signal can be composed of half-cycles of a periodic signal. However, such implementations are not limited to only one half-cycle per TM symbol frame, but can include an integer number of half-cycles per TM symbol frame. Similarly, such implementations are also not limited to only one half-cycle per non-TM symbol frame (or only one TM symbol per non-TM symbol), but can include an integer number of half-cycles per non-TM symbol frame or an integer number of TM symbols per non-TM symbol frame.

In some implementations, TM transmitter 104 synchronizes the phase of sinusoidal signal (signal A) with non-TM symbols. For example, signal generator 220 can generate the sinusoidal signal (signal A) such that it is synchronized with the symbol frame period of the non-TM signal. In such implementations, the changes in the symbols of the non-TM signal can serve as a synchronization signal at the receiver for detecting the TM symbols. In such implementations, the changes in the symbols of the non-TM signal can serve as a synchronization signal at the receiver for demodulating the TM signal. In some implementations, TM transmitter 104 can generate the sinusoidal signal (signal A) as a harmonic of the carrier signal.

In some implementations, TM transmitter 104 synchronizes the phase of sinusoidal signal (signal A) with the phase of a carrier signal. For example, signal generator 220 can generate the sinusoidal signal (signal A) such that it is in phase with the carrier signal generated by carrier generator 206. In such implementations, the carrier can serve as a synchronization signal at the receiver for demodulating the TM signal. In some implementations, TM transmitter 104 can generate the sinusoidal signal (signal A) as a harmonic of the carrier signal.

In some implementations, TM transmitter 104 can adjust the data rates of one or both of the TM and QAM signals. For example, TM transmitter 104 dynamically control the TM symbol mapper 224, the QAM symbol mapper 210, or both to adjust the respective TM or QAM constellations (e.g., bits/symbol) to account for changes in the transmission channel conditions. For example, if channel noise increases, TM transmitter 104 can control one or both of the symbol mappers 224, 210 to contract the respective symbol constellation and decrease the number of bits/symbol. By contrast, if channel noise decrease, TM transmitter 104 can control one or both of the symbol mappers 224, 210 to expand the respective symbol constellation and increase the number of bits/symbol.

In some implementations, transmitter 104 can transmit the TM modulated signal without adding the QAM signal. For example, transmitter 104 can be configured to selectively turn QAM I/Q modulator 212 on and off. Similarly, transmitter 104 can be configured to selectively turn internal carrier modulator 208 on and off. If, for example, the combined data rate of TM and QAM signals is not needed transmitter 104 can select to transmit data using either a TM signal or a QAM signal alone.

In some implementations, carrier generator 206 can be a hardware oscillator. In some implementations, carrier generator 206 can be a software module that generates a carrier or local oscillator signal. In some implementations, carrier generator 206 may be separate from transmitter 104. For example, transmitter 104 can receive a carrier signal can from an external oscillator or clock.

In some implementations, the QAM modulator 212 can be located before the internal carrier modulator 208. For example, the QAM modulator 212 can modulate the carrier signal with the QAM signal before internal carrier modulator 208 applies the internal TM signal to the carrier signal. In such implementations, internal carrier modulator 208 can receive the QAM modulated carrier signal and, using techniques described above, insert the internal TM signal into the QAM modulated carrier signal. In other words, internal carrier modulator 208 can be configured to insert the internal TM signal into an unmodulated carrier signal or into a carrier signal that is modulated with a non-TM signal (e.g., traditional modulation signal).

Figure 4:
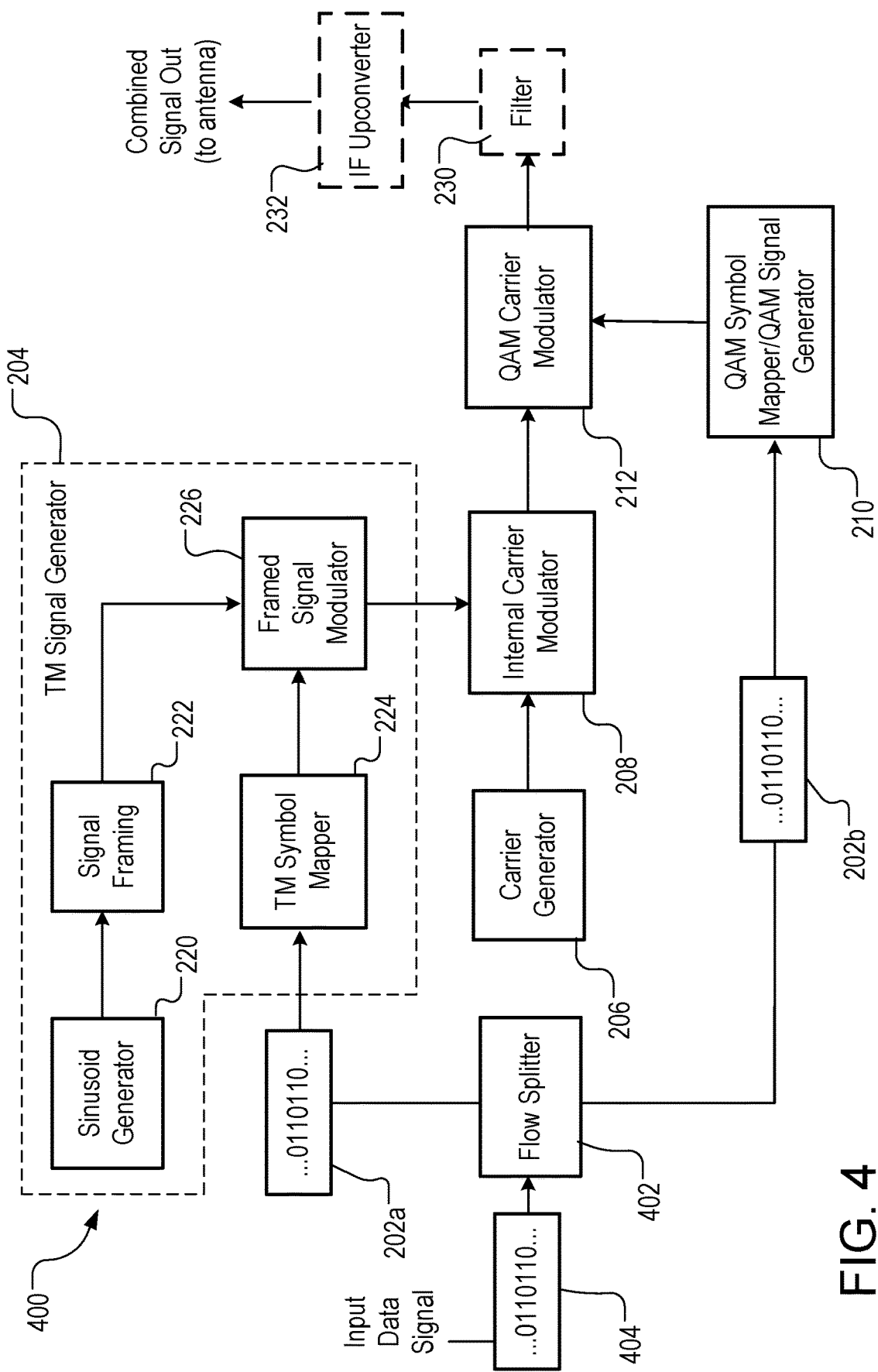
FIG. 4 depicts a block diagram of another representative TM signal transmitter in accordance with implementations of the present disclosure.

FIG. 4 depicts a block diagram of another representative TM transmitter 400 in accordance with implementations of the present disclosure. TM transmitter 400 is similar in operation to transmitter 104. However, instead of transmitting two independent data streams, one as a TM signal and another as a QAM signal, TM transmitter 400 splits data stream 404 to transmit a first portion 202a of the data stream 404 as a TM signal and a second portion 202b of the data stream 404 as a QAM signal. TM transmitter 400 includes a data flow splitter 402 that splits the input data stream 404 into two portions 202a, 202b and feeds one portion 202a to the TM portion of the transmitter and the other portion 202b to the QAM portion of the transmitter 400. Data flow splitter 402 can apportion the input data stream based on the individual data rates of the TM and QAM signals. For example, if the data rate of the TM signal is greater than that of the QAM signal, data flow splitter 402 can apportion a greater portion of the data from data stream 404 to data stream 202a which is sent to the TM signal processing components of TM transmitter 400. TM transmitter 400 may thus increase the data throughput of a single data link by applying the increase in data throughput gained by the combined TM/QAM signal to a single data stream 404.

In some implementations, data flow splitter 402 can be dynamically controlled to adjust the apportionment of data between the TM and QAM signals. For example, if transmitter 400 changes symbol constellation of one or both of the modulation signals due to channel conditions, TM transmitter 400 can adjust the apportionment of data between the TM and QAM signals to account for the corresponding changes in data rate. In some implementations, the data flow splitter 402 can adjust the apportionment of data between the TM and QAM signals on each symbol in order to provide improved performance. For example, the data flow splitter 402 can adjust the apportionment of data between the TM and QAM signals on each symbol to perform forward error correction (FEC) interleaving which may provide a reduction of data stream bit errors due to noise.

Figure 11:
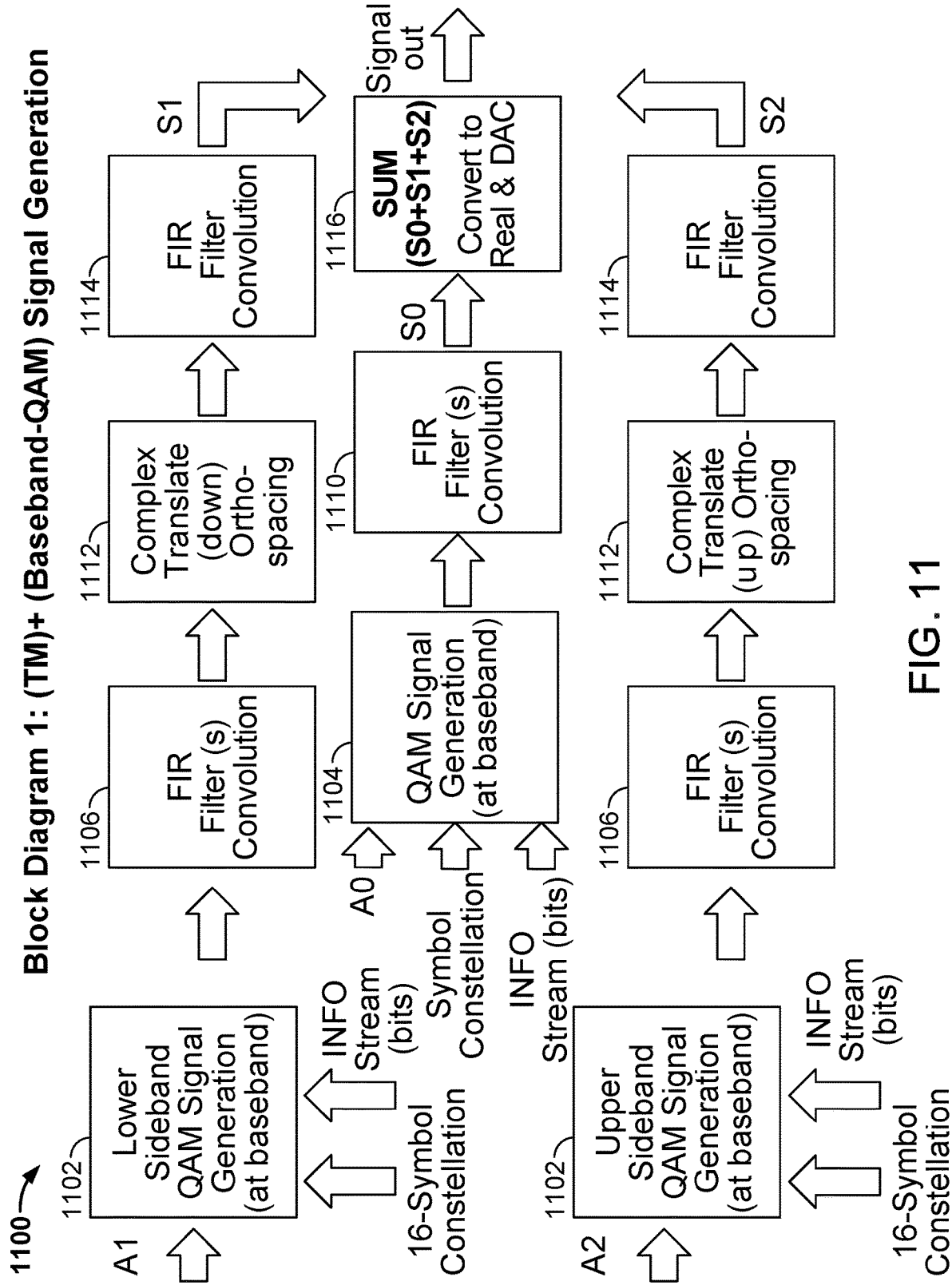
FIG. 11 depicts a block diagram of another representative TM transmitter in accordance with implementations of the present disclosure.

FIG. 11 depicts a block diagram of another representative TM transmitter 1100 in accordance with implementations of the present disclosure. Like TM transmitters 104 and 400, TM transmitter 1100 is an integrated TM transmitter. That is, TM transmitter 104 is integrated with non-TM transmitter components. TM transmitter 1100 can be implemented in hardware (e.g., as integrated circuits, chip-sets, application specific integrated circuits (ASIC) or field programmable logic arrays (FPGA)) or in software (e.g., as a software defined radio (SDR)). For simplicity of discussion, TM transmitter 1100 is illustrated and described in the context of combining a TM signal with a QAM signal. However, TM transmitter 1100 may be configured to combine TM with other non-TM modulation types including, but not limited to, AM, FM, PM, QPSK, APSK, DPSK, or FSK.

TM transmitter 1100 differs slightly from TM transmitters 104 and 400 in that it performing a similar type of internal TM modulation but combining the TM signals with the non-TM signal in the frequency domain rather than in the time domain. TM transmitter 1100 exploits the frequency spectrums of the non-TM signal and the TM signal to place a different TM-signal at each of the upper and lower sideband of the non-TM signal. For example, TM transmitter 1100 can employ frequency domain techniques to insert two different TM signals into sidebands of the non-TM signal's frequency spectrum, a TM modulation technique that may be referred to as "independent sideband TM."

For example, as a whole, TM transmitter 1100 separately generates, at baseband, a non-TM signal S0 and one or more TM sideband signals S1, S2. Each of the signals S0-S2 are generated based on respective input data signals A0-A2. That is, each of the signals S0-S2 is modulated to carry transmit its respective data signal A0-A2. In some examples, the data signals A0-A2 can each be portions of common signal (e.g., one common data signal such as a video split into separate portions for transmission). In some examples, one or all of the data signals A0-A2 can be independent from each other (e.g., A0 may be video data, A1 may be voice data, and A2 may be a data file). Each of the TM signals (S1, S2) can be generated as complex modulation signals (e.g., modulated in both amplitude and phase), similar to the internal TM modulation signal described above in reference to TM transmitters 104 and 400. However, instead of performing the internal modulation in the time domain the "independent sideband TM" signals (S1, S2) are shaped, e.g., by filtering, to fit within nulls of the frequency spectrum of the non-TM signal S0. As described in more detail below, the frequency spectrum (e.g., bandwidth) of the non-TM signal S0 can be shaped (e.g., filtered) to fit a defined by a spectral mask associated with a particular communication channel. The TM signals (S1, S2) are frequency shifted to be placed within the upper and lower nulls of the non-TM signal's frequency spectrum. TM signals (S1, S2) are then combined with the non-TM signal in the frequency domain to generate the combined output signal. The "independent sideband TM" signals (S1, S2) can be considered similar to the internal TM modulation signal of TM transmitters 104 and 400, except that they are combined with the non-TM signal in the frequency domain rather than in the time domain by an internal carrier modulator 208. Independent sideband TM modulation is an extension of internal TM modulating that allows the TM side band signals to be independently modulated and carry independent data, rather than being duplicate copies of one another, as is the case in internal TM modulation.

TM transmitter 1100 includes several modules, each of which can be implemented in hardware or software. For example, each of the modules can be implemented in hardware as an integrated circuit, a chip-set, an ASIC, FPGA, as a software module (e.g. one or more code blocks), or a combination thereof. TM transmitter 1100 includes one or more independent TM sideband signal generators (TMsb-SG) 1102 (e.g., an upper TMsb-SG and a lower TMsb-SG), a non-TM signal generator 1104 (e.g., QAM signal modulator), filters 1106, 1110, 1114, frequency shifters 1112 and a signal combiner 1116.

The non-TM signal generator 1104 modulates input signal A0 to generate a non-TM signal S0 with which the independent sideband TM signal will be combined. The TMsb-SG 1102 modulate input data signals A1 and A2 to generate independent upper and lower TM sideband signals S1, S2. TMsb-SG 1102 can modulate the amplitude, phase, or both to generate the TM sideband signals. Filters 1106 pre-filter the TM sideband signals S1, S2 to fit within respective upper and lower sideband nulls in the frequency spectrum of the non-TM signal S0. For example, filters 1106 can be finite input response (FIR) filters or other types of digital filters. Filter 1110 filters the non-TM signal prior to combination with the TM sideband signals S1, S2. For example, filter 1110 can be spectral mask filter. Filter 1110 can be a FIR filter or other type of digital filter. Frequency shifters 1112 shift the TM sideband signals S1, S2 in the frequency domain from baseband to the respective upper and lower sideband nulls of the non-TM signal S0. For example, frequency shifters 1112 can be mixers configured to heterodyne the TM sideband signals S1, S2 up (down) in frequency to align with a null in the spectrum of the non-TM signal S0. Filters 1114 can be used to filter the TM sideband signals S1, S2 prior to combination with the non-TM signal S0. For example, filters 1114 can be configured to shape the spectrum of the TM sideband signals S1, S2 to fit appropriately within their respective nulls of the non-TM signal S0. For example, filters 1114 can be FIR filters or other types of digital filters. Signal combiner 1116 combines the TM sideband signals S1, S2 with the non-TM signal S0 to provide the combined output signal. The combined output signal can then be converted from digital to analog (DAC). The combined signal is up-converted from baseband to a common carrier frequency for transmission. In some implementations, the transmitter can implement mathematical transforms such as an FFT to add the TM sideband signals S, S2 to the non-TM signal S0 and convert the combined signal back to time domain for output to the DAC.

In more detail, first, the frequency spectrum of a combined TM and QAM signal is explained. As discussed above, the combined signal can be represented by: $V_{comb}(t)=Q(t)$ $e^{(i\omega_c t + \Phi_{TM}(t))}$, where $\Phi_{TM}(t) = \varepsilon_k \sin(\omega_m t + \theta_k)$ is the complex internal TM signal (e.g., a "TM-QAM signal"). This equation can be rewritten as a sum of QAM and TM symbol frames (N) as follows:

$$x(t) = \sum_N |Q_n| e^{(i\Psi_n + i\beta_N \sin(\omega(t - NT_F) + \theta_N))} h(t - NT_F),$$

where $|Q_n|$ and $\Psi_n$ are the magnitude and phase, respectively, of the N-th QAM symbol; $\beta_N$ is the TM modulation index (replacing $\varepsilon_k$ as used above), and may also be referred to as the complex TM amplitude; $\theta_N$ is the TM phase shift; $T_F$ is the frame period of both the QAM and TM signals; $\omega$ the internal TM signal frequency; and $h(t-NT_F)$ represents a window function of length $T_F$ that corresponds to each frame N of the signal. $\omega$ is selected as $\omega = 2\pi/T_F$ so that sinusoidal phase modulation of TM has exactly one period within the frame interval, $T_F$.

The QAM amplitude and phase terms can be factored out as a complex multiplicative term to the complex exponential; the latter term can be expanded in terms of a Fourier-Bessel Series using the following two identities:

$$\cos(z \sin \alpha) = J_o(z) + 2\Sigma_{k=1}^{\infty} J_{2k}(z) \cos(2k\alpha); \text{ and}$$

$$\sin(z \sin \alpha) = 2\Sigma_{k=1}^{\infty} J_{2k}(z) \sin(2k\alpha).$$

Figure 12:
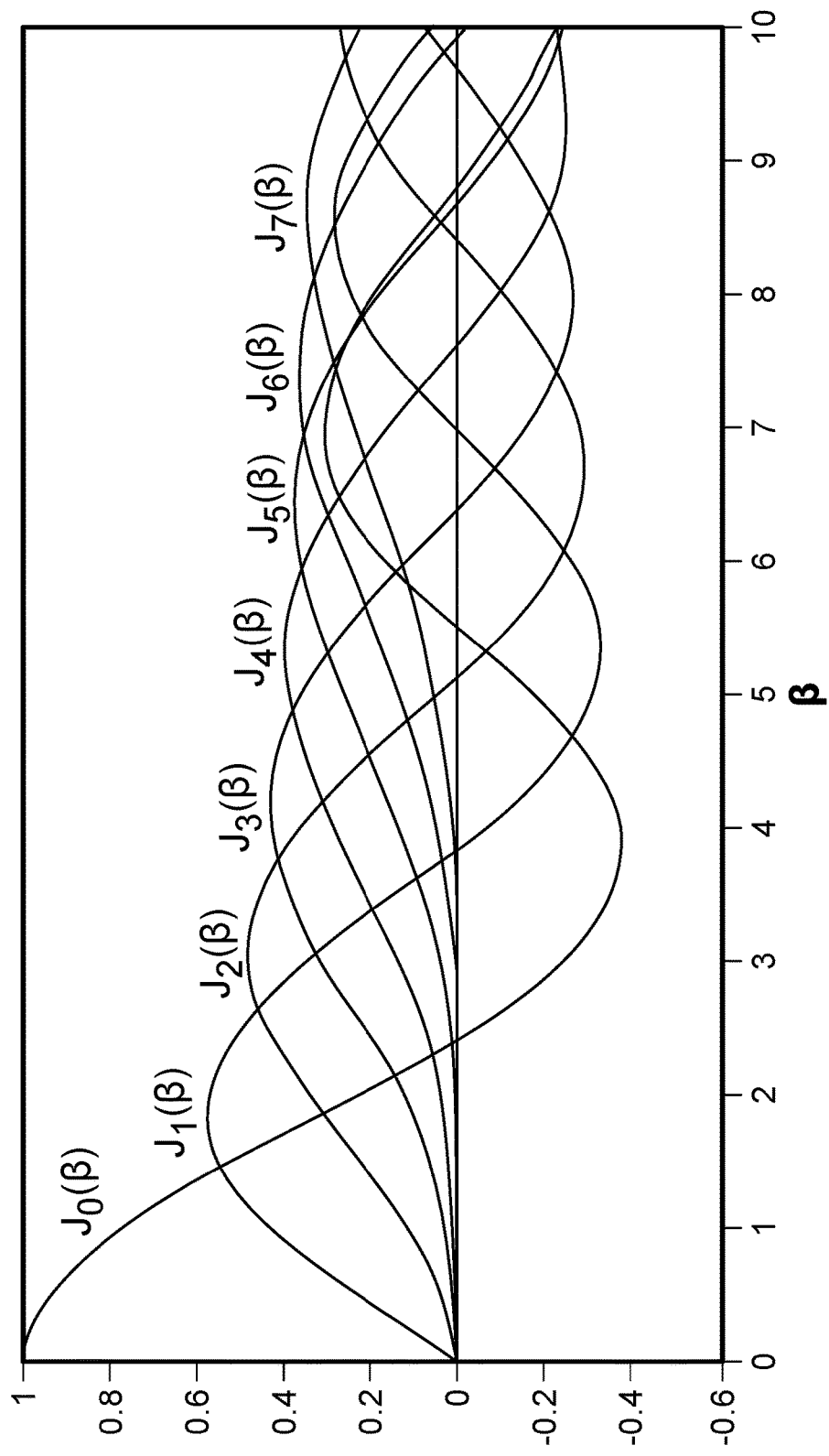
FIG. 12 depicts a plot of Bessel Functions.

From the above identities, and using Euler's identity, $e^{i\alpha} = \cos(\alpha) + i \sin(\alpha)$, the following approximate result is readily shown to be valid for small modulation index ($\beta$): $e^{i\beta \sin(\varphi)} \cong J_o(\beta) + J_1(\beta)e^{i\varphi} - J_1(\beta)e^{-i\varphi}$ +(higher order Bessel functions). The higher order Bessel function terms are ignorable. Here the $J_0(\beta)$ and $J_1(\beta)$ are the regular Bessel Functions of order 0 and 1, respectively. A typical value for $\beta$ is <<1. To illustrate the behavior of the Bessel functions, a plot 1200 of several Bessel functions of integer order vs. $\beta$ are presented FIG. 12. For small values of R<<1, it can be seen that the value of $J_0(\beta)$ is unaffected by the value of $\beta$ and remains near unity, while the value of $J_1(\beta)$ is essentially linear with $\beta$. These conclusions are reinforced by the small argument Taylor Series expansion for integer order (v) Bessel Functions: $J_v(z) = (z/2)^v \Sigma_k (-z^2/4)^k [k! \Gamma(v+k+1)]^{-1}$.

Here the summation index k runs from 0 to infinity, and the Gamma function for integer order is as follows: $\Gamma(n) = (n-1)!$, where $0! = 1! = 1$. For order 0, we compute a value for the Bessel function $J_0(z)$ of approximately 1, and for the Bessel function of order 1, we compute a value of $\beta/2$, proportional to $\beta$. Therefore, if we modulate $\beta$ as $\beta \sim \beta 0 + \delta\beta$, the amplitude of the $J_1$ term will follow $\delta\beta$ linearly.

To summarize, the TM phase is modulated similar to a QAM phase for the TM modulation and the magnitude of the TM modulation index $\beta$ (also referred to as $\varepsilon$ above) in order to carry the amplitude of the TM modulation in a manner similar to QAM modulation. The QAM signal is generated at baseband, while the TM signal can be redundantly carried on both the upper and lower sidebands of the QAM signal with orthogonal frequency spacing, which provides transparency. The frequency locations of the $J_1$ and higher terms turn out to correspond to sidebands at the orthogonal frequency spacing [0, (+/−) $1/T_F$], which are similar to the spacing used in Orthogonal Frequency Division Multiplexing (OFDM). In practice, TM modulations places the TM information into sidebands that are located at the frequency nulls of the baseband-QAM spectrum. The TM+baseband-QAM combined signal is therefore utilizing spectrum that is unused by the original baseband-QAM signal.

An important difference between this approximation to the TM+baseband-QAM signal and conventional OFDM, however, is the large difference in the relative band amplitudes. The sidebands that carry the TM signal have much smaller amplitudes than that of the QAM baseband signal. However, a three-frequency OFDM signal, each carrying QAM data, would have sidebands with similar frequency spacing to the TM+baseband-QAM signal, but the OFDM "sidebands" would have sideband amplitudes equal to the baseband-QAM signal. Therefore, with amplitudes for each modulated frequency, the combined signal spectrum of the combined OFDM signals would occupy much greater bandwidth than the TM+baseband-QAM signal. Thus, from a spectral efficiency point of view, the TM+baseband-QAM modulation is much more spectrally efficient. It is also worth noting that the analysis above demonstrates that only the first two terms of the Bessel-Fourier expansion are needed in order to get a very good approximation to "ideal" TM. Another advantage of TM over OFDM is that TM has a much lower peak to average power ratio in the time domain signal than OFDM. OFDM's greater peak to average power ratio can be problematic for OFDM radio design as it generally requires a power amplifier with a relatively high dynamic range. The lower peak to average power ratio of TM, relative to OFDM, alleviates this problem as TM radios (e.g., transmitters/receivers) can be designed with power amplifiers having a lower dynamic range.

Furthermore, in some implementations, the upper and lower sidebands which carry the TM-QAM signal, can be adjusted in amplitude in order to fit into what may be a rather severe spectral "mask" of the non-TM signal (e.g., QAM) by varying the value of $\beta 0$.

Referring back to FIG. 11, the transmitter 1100 employs a TM modulation process that produces independent TM sidebands, which may reduce the redundancy of having two identical TM sidebands. For example, the transmitter 1100 generates two separate TM signals each carrying different data streams. The TM signals can be generated as complex signals (e.g., similar to a QAM signal). For example, a lower sideband complex TM signal is generated at baseband from a first data signal, and an upper sideband complex TM signal is generated at baseband from a second data signal. Each separate TM signal can be filtered. For example, the TM signals can be filtered to fit within a spectral mask of the non-TM signal (e.g., a QAM signal). The non-TM signal (e.g., the QAM signal) is also generated at baseband. The two TM signals are then shifted in frequency (e.g., heterodyned) to the upper and lower the nulls in the upper and lower sideband spectrum of the non-TM signal (e.g., QAM signal). Redundant sidebands of the TM signals can be removed by filtering the frequency shifted signals before they are combined (e.g., summed) with the non-TM (e.g., QAM signal).

In FIG. 11 the three separate baseband signals are labeled as follows: S0, Band 0=Baseband QAM signal; S1, Band 1=Lower TM signal; S2 Band 2=Upper TM signal. The independent TM side band technique improves upon the internal TM modulation techniques described above by making even more efficient use of signal spectrum. For example, there is no reason to carry two sidebands of TM with redundant information. All three frequency bands (QAM, upper and lower TM signals) can be independently modulated with separate information in order to create a combined signal that is a true TM variant. This variant we refer to as independent-sideband TM plus QAM modulation.

The independent sideband approach achieves a higher data rate than the double sideband internal TM modulation discussed above.

In some implementations, the two TM signals can be independently filtered and spectrally shaped, in order to better fit any reasonable spectrum mask of the non-TM QAM signal. In some implementations, the frequencies for orthogonal spacing are not exactly the same as needed for correct TM signal spacing; a correct spacing may place each of the sidebands on the null of the spectral response of the filtered Baseband-QAM signal. For instance, in some implementations the sidebands are positioned slightly offset from the nulls in the non-TM signal. Doing so may provide a more precise fit to the spectral mask, allow more adaptability to fixed clock rates in the radio (e.g., reducing constraints on the radio's clock tree), help to simplify FPGA gate layout, or a combination thereof.

A simplified analysis can establish the relative advantage of the TM+baseband-QAM relative to baseband-QAM alone. An understanding of the how much extra information might theoretically be added to a signal with two independently modulated TM sidebands can be arrived at by considering Shannon's ideal Channel Capacity result. Shannon's formula for ideal Channel capacity for a bandlimited signal in additive white Gaussian noise (AWGN) is as follows: $C=W \log_2 (1+P_S/P_N)$ (in bits/sec), where C is the channel capacity in bits/sec, W is the bandwidth in Hz, and $P_S$, $P_N$ are the in-band noise powers, so $P_S/P_N$ is the signal to noise power ratio, $SNR_P$. If we divide the Channel Capacity C by the bandwidth, W, we obtain Shannon's theoretical limit on spectral efficiency: $SE=\log_2 (1+P_S/P_N)$, bits/sec/Hz When $SNR_P$. is large, e.g. ~10,000, (40 dB SNR), a very large increase in power is required to achieve a significant increase in spectral efficiency. Continuing on with this thread, the theoretical maximum spectral efficiency for a 40 dB SNR baseband signal is given by the following expression: $C=\log_2 (10,000)=13.29$ bps/Hz.

In this regime the capacity grows logarithmically with power, but the capacity grows linearly with bandwidth. On the other hand, a single 10 dB SNR sideband can theoretically carry $\log_2 (10)=3.32$ bps/Hz, so that two of these, when combined with the original 40 dB SNR signal (assuming 100% transparency) could theoretically carry 2×3.32 bps/Hz+13.29 bps/Hz, or ~19.9 bps/Hz. The 10 dB SNR sidebands are 30 dB down from the original 40 dB SNR signal, so that the required power to add the extra information is only 1.002 times the original power required (0.0087 dB), for a theoretical information gain about a 50% increase in capacity, and with essentially no change in "bandwidth" as it is typically measured.

Aspects of the previously described TM transmitters 104, 400 can, optionally, be incorporated in into TM transmitter 1100. For instance, although not shown, TM transmitter 1100 can include the flow splitter 402 of transmitter 400 to split a single input data signal between the non-TM signal and the two upper and lower sideband TM signals. In some implementations, the flow splitter 402 can be arranged to split a common input data single between the upper and lower sideband TM signals, while using the non-TM signal to transmit a different, unrelated data signal (e.g., similar to the process illustrated by TM transmitter 104).

Figure 5:
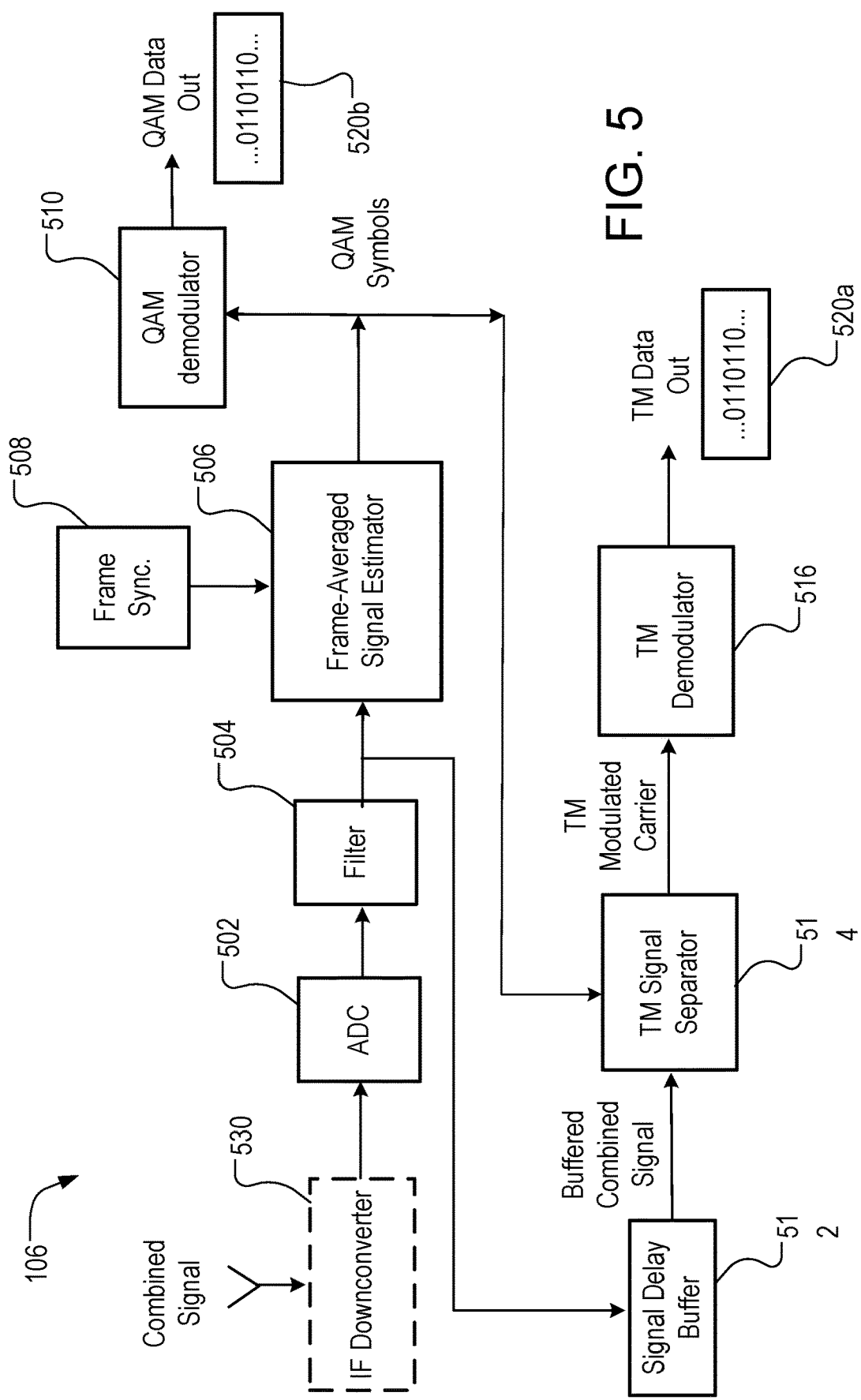
FIG. 5 depicts a block diagram of a representative TM signal receiver in accordance with implementations of the present disclosure.

FIG. 5 depicts a block diagram of a representative TM signal receiver 106 in accordance with implementations of the present disclosure. TM receiver 106 is an integrated TM receiver. That is, TM receiver 106 is integrated with non-TM transmitter components. TM receiver 106 can be implemented in hardware (e.g., as integrated circuits, chip-sets, application specific integrated circuits (ASIC) or field programmable logic arrays (FPGA)) or in software (e.g., as a software defined radio (SDR)). TM receiver 106 includes several component modules which are described in more detail below.

For simplicity of discussion, TM receiver 106 is illustrated and described in the context of receiving a combining TM and QAM signal. However, TM receiver 106 may be configured to receive TM signals combined with other non-TM modulation types including, but not limited to, AM, FM, PM, QPSK, APSK, DPSK, or FSK. That is, for example, in some implementations, QAM components 510 and 512 may be replaced by or supplemented with corresponding modulation components for performing PSK demodulation. In some implementation, for example, TM receiver 106 can include multiple sets of non-TM modulation components. TM receiver 106 can configured to select between receiving TM signals with any of the configured non-TM types of modulation. For example, a processor can be used to select between several non-TM signal types which may be combined with a TM signal.

As a whole, TM receiver 106 receives combined signal (e.g., $V_{comb.}$) that includes a carrier signal modulated with both a TM signal and a QAM signal. TM receiver 106 demodulates the QAM signal. TM receiver 106 can determine average values of the QAM signal over the QAM symbol frames and demodulate the QAM signal using the average values. TM receiver 106 removes the QAM modulation from the combined signal. TM receiver 106 uses the QAM symbol values to remove the QAM modulation from the combined signal, thereby, leaving only the TM signal. TM receiver 106 demodulates the TM signal. TM receiver 106 can demodulate the TM signal by extracting the TM signal (e.g., the internal TM modulation signal) from the phase of the carrier signal. TM receiver 106 identifies the TM symbols by detecting the discrete phase shifts in the TM signal to demodulate the TM signal. For example, TM receiver 106 can compare the TM signal to a reference sinusoid to detect the phase shifts in the TM signal.

In more detail, TM receiver 106 includes several modules, each of which can be implemented in hardware or software. For example, each of the modules can be implemented in hardware as an integrated circuit, a chip-set, an ASIC, FPGA, as a software module (e.g. one or more code blocks), or a combination thereof. TM receiver 106 includes an analog-to-digital converter (ADC) 502, a filter 504, a frame-averaged signal estimator (FASE) 506, a frame synchronizer 508, a QAM demodulator 510, a signal delay buffer 512, a TM signal separator 514, a TM demodulator 516, and, optionally, an IF downconverter 530.

TM receiver 106 receives a combined signal $(V_{comb.}(t)=Q(t) A e^{(t \omega_c t + \Phi_{TM}(t))})$. In some implementations, TM receiver 106 shifts the combined signal to an intermediate frequency (IF), for example, using IF downconverter 530. In some implementations, TM receiver 106 downshifts the combined signal to baseband. TM receiver 106 can downshift the combined signal to baseband by multiplying the combined signal with an unmodulated sinusoid at the carrier frequency and filtering the combined signal to remove higher order harmonics.

The combined signal is converted from an analog signal to a digital signal by ADC 502 and filtered by filter 504. Filter 504 is a receive filter that filters the combined signal, for example, to remove noise and other extraneous signals. For example, filter 504 can be a band pass filter that matches the pass-band of the transmission channel.

TM receiver 106 supplies the combined signal to signal delay buffer 512 and FASE 506. FASE 506 receives the filtered combined signal. Furthermore, for the n-th QAM symbol frame the combined signal can be written as $V_{comb.\_n} = |Q_n| A\, e^{(i\,\Psi_n + \Phi_{TM}(t))}$. In some implementations, TM receiver 104 can determine a channel gain by using a known calibration signal. TM receiver 104 can the amplify the combined signal so that the amplitude, A, can be set to 1, leaving $V_{comb.\_n} = |Q_n| e^{(i\,\Psi_n + \Phi_{TM}(t))}$. FASE 506 may receive data indicating the beginning and end of each QAM frame from frame synchronizer 508. For example, the frame synchronizer 508 can detect the edges of the QAM frames and provide appropriate timing signals to the FASE 506.

FASE 506 determines average values of the combined signal over each QAM symbol frame to recover the QAM symbol value of each QAM frame of the combined signal. The QAM symbols in the combined signal have a constant complex value over each symbol period. Moreover, as discussed above, the phase variations caused by the TM modulation average out over each symbol QAM. FASE 506 can recover the QAM symbol values by determining time averaged values of the combined signal over the QAM symbol frames. For example, FASE 506 can determine the QAM symbol amplitude by determining the mean of the absolute value of the combined signal; mathematically $|Q_n| = <|V_{comb.\_n}|>$, where the angle brackets $<\,>$ indicate a time average over the n-th QAM frame. In some implementations, the FASE 506 can perform a weighted time average of the combined signal. For example, the time average for each symbol can be weighted based on the respective modulation strengths of the TM signal and the QAM signal.

Figure 6:
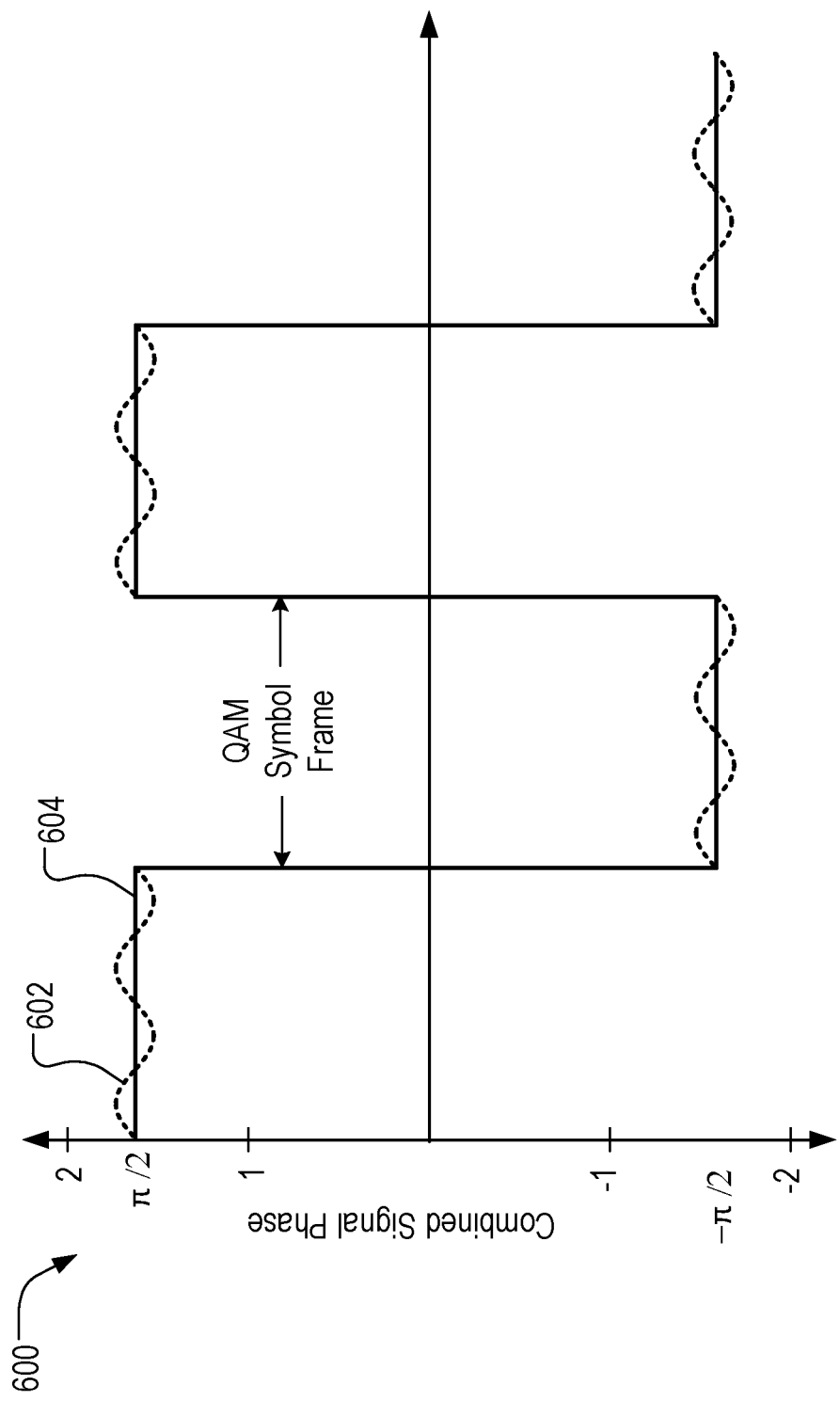
FIG. 6 depicts a graph illustrating phase cancellation of a TM signal over a symbol frame of a non-TM signal in accordance with implementations of the present disclosure.

FASE 506 can determine the QAM symbol phase by taking the arc tangent of the real and imaginary parts of the combined signal; mathematically $\Psi_n = <\mathrm{arctan}(\mathrm{Imag}\{V_{comb.\_n}\}, \mathrm{Re}\{V_{\_}(\mathrm{comb.\_n})\})>$, where the angle brackets $<\,>$ indicate a time average over the n-th QAM frame, and where arctan( ) represents the four-quadrant arc-tangent function. For example, FIG. 6 shows a graph 600 illustrating a representation of the phase of the combined signal over several QAM symbol frames. The instantaneous phase of the combined signal is shown as dashed line 602. The time averaged QAM phase is shown as solid line 604. As discussed above, the internal TM modulation cause the phase of the combined signal to oscillate, however, the oscillations will average out to zero over each QAM symbol frame, thus, making the TM signal transparent to the QAM signal.

FASE 506 outputs the recovered QAM symbol values to the QAM demodulator and TM signal separator 514. QAM demodulator 510 converts the QAM symbol values to corresponding digital data. QAM demodulator 510 outputs the digital data stream 520b that is received from the QAM portion of the combined signal. Data stream 520b corresponds to the input to TM transmitter 104; data stream 202b described above. In some implementations, TM receiver 106 can split a complex combined signal into in-phase and quadrature phase signals. FASE 506 can perform similar operations for each of the in-phase and quadrature phase signals to obtain average QAM signal magnitude and phase.

In some implementations, the FASE 506 can use an envelope detector to extract the amplitude of the QAM symbols. The FASE 506 can determine the magnitude of each QAM signal using the extracted amplitude.

TM signal separator 514 separates the QAM signal from the combined signal to obtain the TM modulated carrier signal. TM signal separator 514 receives the combined signal from signal delay buffer 512 and recovered QAM symbol values from FASE 506. Signal delay buffer 512 delays the combined signal by an appropriate amount of time such that the QAM symbol values that are recovered by FASE 506 are matched with the corresponding QAM symbol frame of the combined signal, e.g., the n-th QAM symbol is matched to the n-th QAM frame of the combined signal. TM signal separator 514 removes the QAM modulation from the combined signal using the recovered QAM symbol value. For example, TM signal separator 514 can divide out the QAM symbol value from each respective frame of the combined signal, yielding the TM modulated carrier. For example, the operation of the TM signal separator 514, for the n-th QAM symbol frame, can be represented by:

$$V_{TM}(t)_{n-th\,frame} = \frac{|Q_n| A e^{(i\Psi_n + \Phi_{TM}(t))}}{|Q_n| e^{(i\Psi_n)}} = A e^{(\Phi_{TM}(t))}.$$

TM demodulator 516 receives the TM modulated carrier signal from TM signal separator 514 and demodulates the TM signal to obtain digital data in data stream 520a. Data stream 520a corresponds to the input to TM transmitter 104; data stream 202a described above. TM demodulator 516 extracts the TM signal from the TM modulated carrier signal. TM demodulator 516 detects the discrete phase shifts in the TM signal to determine the TM symbol values. TM demodulator 516 converts the TM symbol values to corresponding digital data in data stream 520a.

Figure 7:
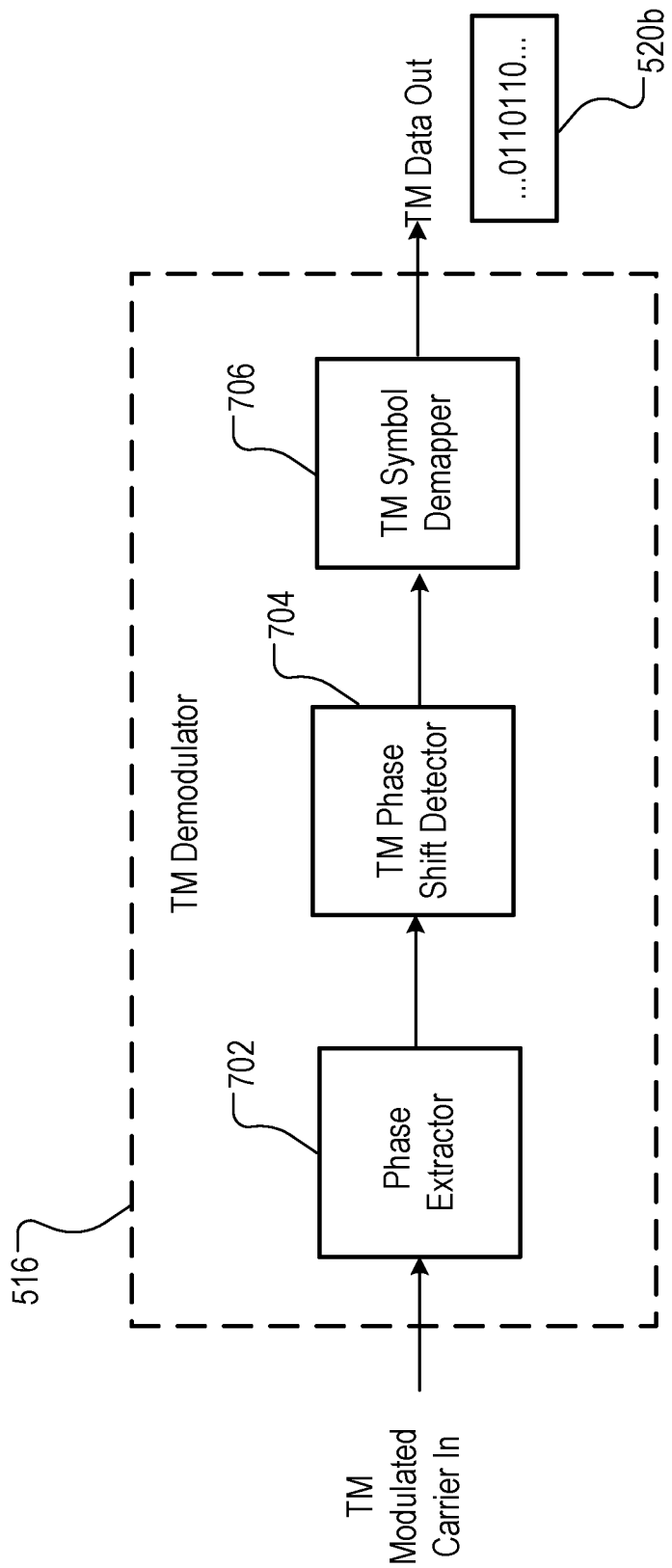
FIG. 7 depicts a block diagram of a representative TM signal demodulator in accordance with implementations of the present disclosure.

For example, FIG. 7 depicts a block diagram of a representative TM signal demodulator 516. TM demodulator 516 can include a phase extractor 702, a phase shift detector 704, and a symbol demapper 706. Phase extractor 702 extracts the TM signal from the phase of the TM modulated carrier signal. For example, the phase extractor 702 can convert complex data received from the TM signal separator 516 to phase data.

Phase shift detector 704 detects the discrete phase shifts in the TM signal that represent the TM symbols. For example, phase shift detector 704 can detect the discrete phase shifts in the TM signal by cross-correlating the TM signal with a reference sinusoid. For example, if the sinusoid signal (e.g., signal A) used by the transmitter 104 to generate the internal TM signal is synchronized with the QAM symbols (as discussed above), TM demodulator 516 can synchronize the reference sinusoid with the QAM symbols to approximate the sinusoidal signal (signal A). Phase shift detector 704 provides the detected phase shift values to symbol demapper 706, which converts the phase shift values (e.g., TM symbol values) to corresponding digital data values. Phase shift detector 704 outputs the digital data stream 520a that is received from the TM portion of the combined signal.

In some implementations, transmitter 104 can transmit a pre-determined TM synchronization signal. For example, a pre-determined synchronization signal can include a pre-determined set of TM symbols. TM demodulator 516 can use the synchronization signal to synchronize the reference signal with the sinusoidal signal used by the transmitter. For example, TM demodulator can adjust the phase of the reference signal to produce the correct TM data symbols from the synchronization signal.

In some implementations, phase shift detector 704 can detect the discrete phase shifts in the TM signal by cross-correlating the TM signal with reference sine and cosine waves (e.g., two sinusoidal reference signals with a 90-degree phase difference between them). The phase shift can be determined by finding the arctangent of the ration between cross-correlation with the sine reference wave and the cosine reference wave.

In some implementations, TM demodulator 704 includes an amplitude shift detector to detect variations in the modulation index of the internal TM signal that represent TM data symbols. For example, an amplitude shift detection can detect amplitude levels in the TM signal in a manner similar to detecting amplitude levels in QAM symbols. Combined amplitude and phase shift values of the TM symbols can be converted to digital data by symbol demapper 706.

Figure 8:
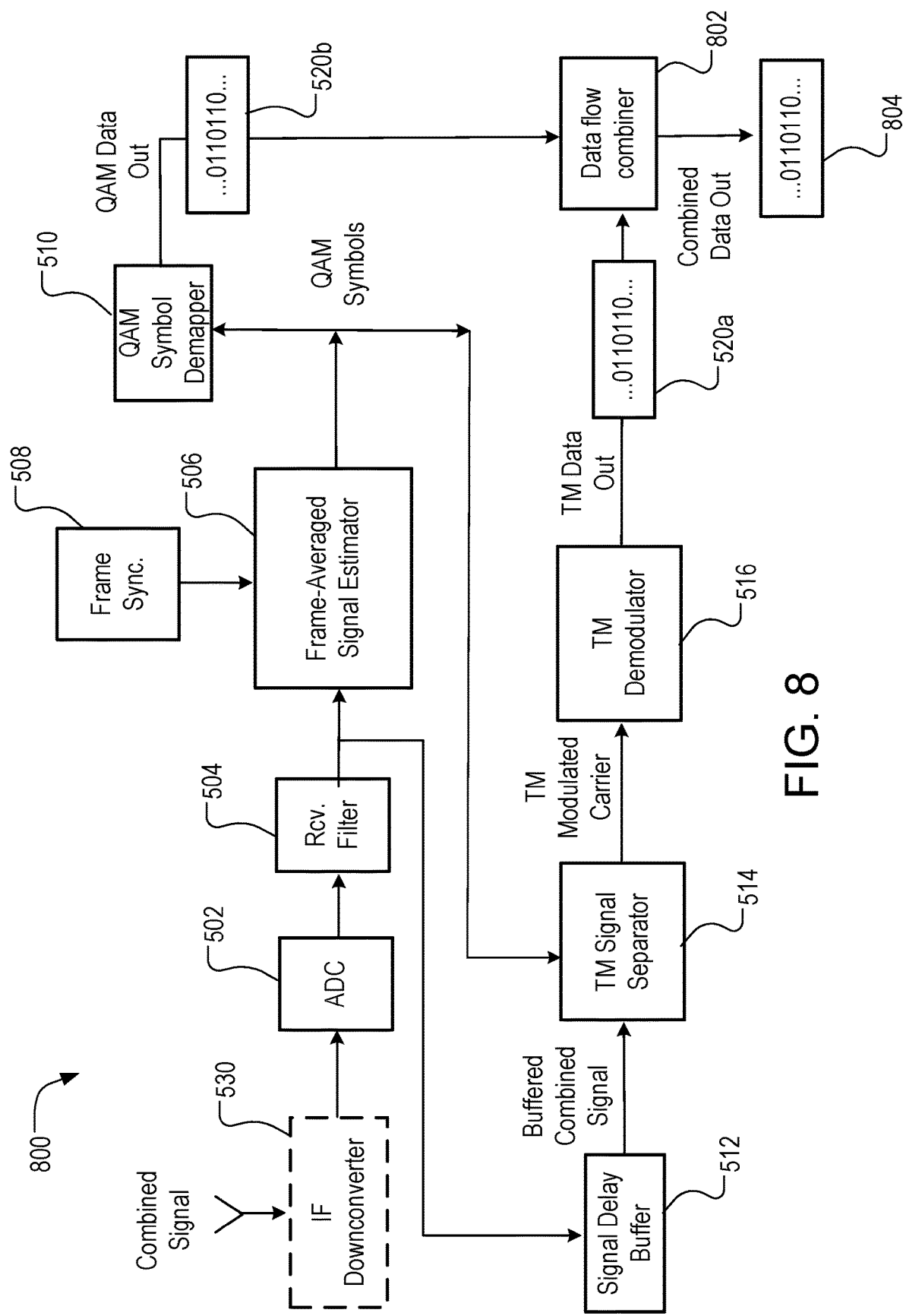
FIG. 8 depicts a block diagram of another representative TM signal receiver in accordance with implementations of the present disclosure

FIG. 8 depicts a block diagram of another representative TM receiver 800 in accordance with implementations of the present disclosure. TM receiver 800 is similar in operation to receiver 106. However, instead of receiving two independent data streams (e.g., data streams 520*a* and 520*b*), one as a TM signal and another as a QAM signal, TM receiver 800 receives one data stream 804 transmitted as a first portion 520*a* by a TM signal and a second portion 520*b* by a QAM signal. TM receiver 800 includes a data flow combiner 802 that combines the respective recovered data streams 520*a* and 520*b* into an output data stream 804 that, for example, corresponds to input data stream 404 of FIG. 4. Data flow combiner 802 can re-combine the recovered data streams 520*a*, 520*b* based on the individual data rates of the TM and QAM signals.

In some implementations, data flow combiner 802 can be dynamically controlled to account for changes in data rate of the TM and QAM signals. For example, if transmitter 400 changes symbol constellation of one or both of the modulation signals due to channel conditions, TM receiver 800 can adjust data flow combiner 802 to account for changes in apportionment of data between the TM and QAM signals in order to properly recombine data streams 520*a* and 520*b*. For example, TM transmitter 400 may send a synchronization data to receiver 800 when the apportionment between the TM and QAM signals is changed in order to permit receiver 800 to properly control data flow combiner 802.

Figure 14:
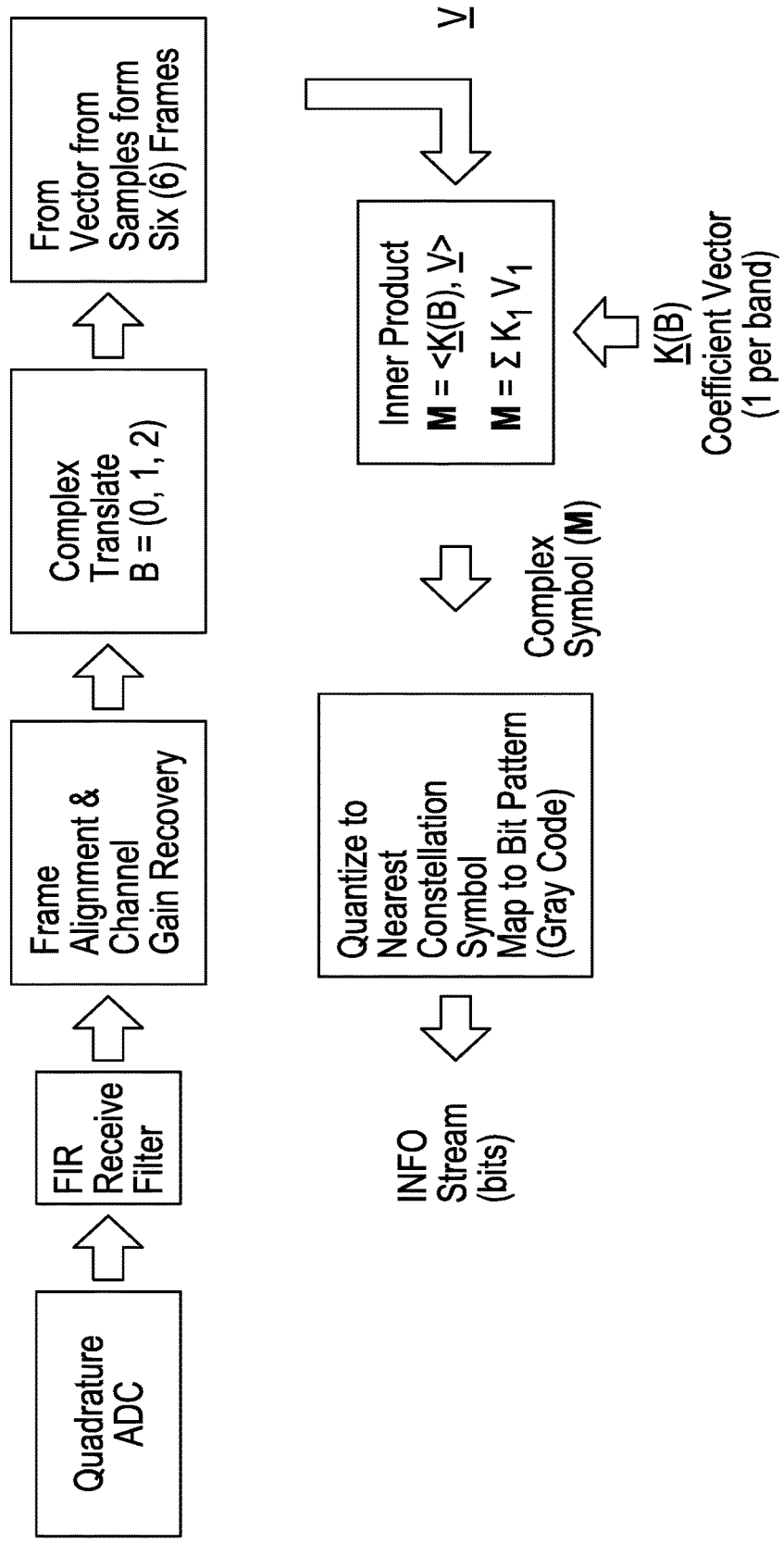
FIG. 14 depicts a block diagram of another representative TM receiver in accordance with implementations of the present disclosure.

FIG. 14 depicts a block diagram of another representative TM receiver 1400 in accordance with implementations of the present disclosure. The receiver 1400 uses separate parallel bands to demodulate the non-TM QAM signal and the two independent upper and lower TM signals. As in reference to FIG. 11, the three separate signals are labeled as follows: S0, Band 0=Baseband QAM signal; S1, Band 1=Lower TM signal; S2 Band 2=Upper TM signal. Each of the independent band is separated (e.g., by filtering). Then, each band is separately translated to baseband for demodulation. After frame alignment (timing recovery) and channel gain recovery is made (this is based on the base-band QAM signal), for each band, vectors of data are formed from samples collected from multiple frames (e.g., 6 frames) of data. For example, the length of a vector may be (6×64)=384 samples. For each vector, one complex symbol is recovered by performing a dot product between the coefficient vector (length 384) with the complex vector samples as shown in the figure. The use of a 6-frame processing interval helps in mitigating the effects of convolutional filtering within the signal chain. The process is then repeated by shifting the 6-frame block of data by one frame (e.g., shifting by 64 sample points).

Figure 9:
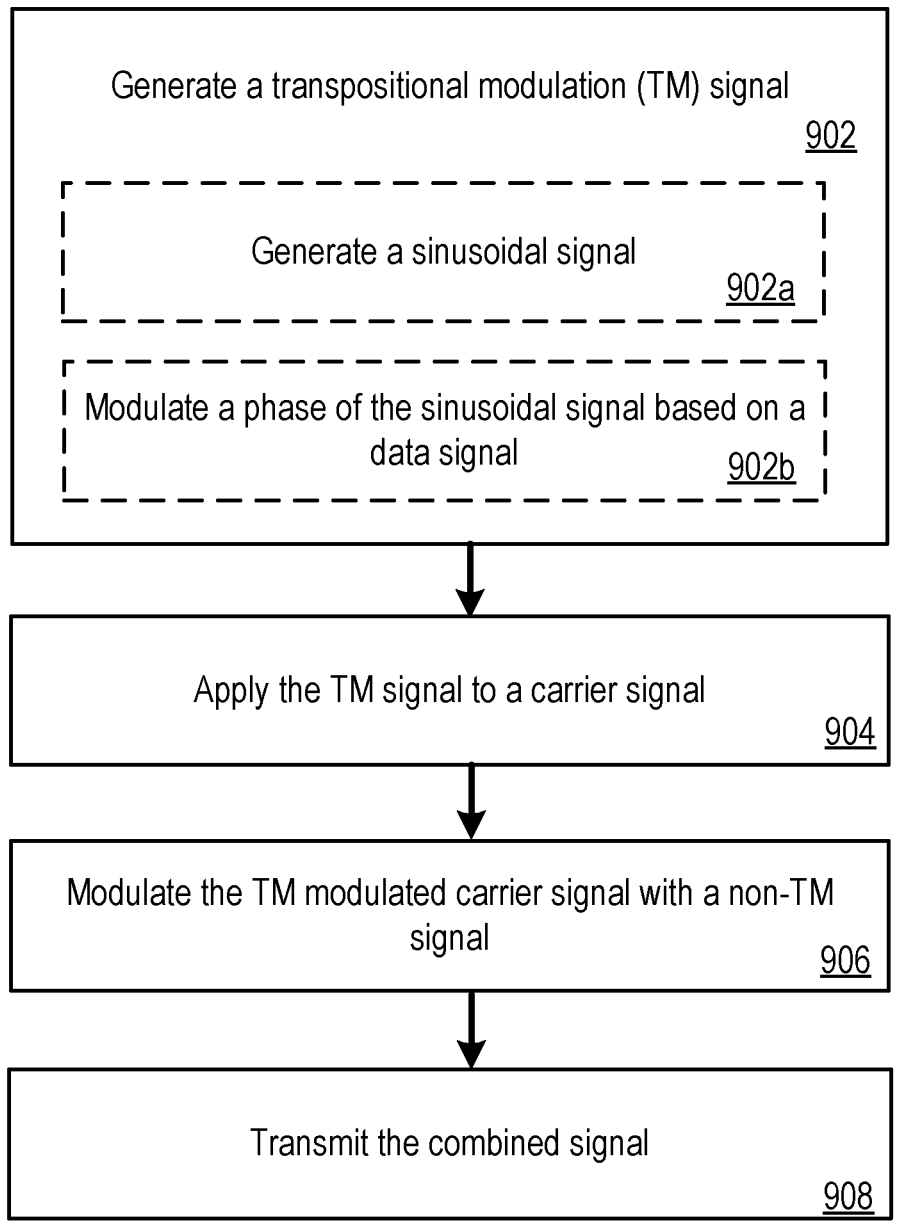
FIGS. 9 and 10 depict example processes that can be executed in accordance with implementations of the present disclosure.

FIG. 9 depicts an example process 900 for modulating a carrier signal. Process 900 can be performed by a transmitter such as transmitter 104 of FIG. 2 or transmitter 400 of FIG. 4. In some examples, the example process 900 can be provided as computer-executable instructions executed using one or more processing devices (e.g., a digital signal processor) or communication devices (e.g., communication devices 102 of FIG. 1). In some examples, the process 900 may be hardwired electrical circuitry, for example, as an ASIC or an FPGA device. In some examples, the process 900 may be executed by an SDR.

A transmitter generates a TM signal (902). For example, the transmitter can generate a TM signal by generating a sinusoidal signal (902*a*), and modulating a phase of the sinusoidal signal (902*b*). The transmitter can generate the sinusoidal signal to have a frequency that is related to the symbol rate of a non-TM signal, the frequency of a carrier signal, or a combination thereof. For example, the transmitter can generate the sinusoidal signal to have a frequency that is an integer multiple of the symbol rate of a non-TM signal with which the TM signal will be combined. The transmitter can generate the sinusoidal signal to have a frequency that is a harmonic of the carrier signal. In some implementations, the transmitter can generate the sinusoidal signal be synchronized with the phase of the carrier signal.

The transmitter can modulate the phase of the sinusoidal signal based on an input data signal. For example, the transmitter can apply discrete phase shifts to the sinusoidal signal that represent digital data of the input data signal. The transmitter can shift the phase of the sinusoidal signal by a discrete phase shift for each data value in the data signal. In other word, the discrete phase shifts can represent TM symbols that correspond to combinations of digital data. For example, an N-ary TM signal can represent N-bits of data in a constellation of $2^N$ TM symbols (e.g., $2^N$ different discrete phase shift values).

The transmitter applies the TM signal to the carrier signal to provide a TM modulated carrier signal (904). For example, the transmitter inserts the TM signal into the phase of a carrier signal to provide a TM modulated carrier signal. For example, the transmitter can add the TM signal to the phase of the carrier signal. In some implementations, the transmitter can insert the TM signal into the frequency of the carrier signal to provide the TM modulated carrier signal. In some implementations, the carrier signal may be a complex carrier.

The transmitter modulates the TM modulated carrier signal with a non-TM signal to provide a combined signal (906), and transmits the combined signal (908). The non-TM signal can include, but is not limited to, a QAM signal, an AM signal, an FM signal, or a PM signal. For example, the transmitter modulate the TM modulated carrier with a QAM signal based on a second input data signal. The second input data signal can be independent from the first input data signal used to produce the TM signal. In some implementations, the transmitter can split an input data signal such that a portion of the input data signal is transmitted as a TM signal and another portion of the input data signal is transmitted as a non-TM signal (e.g., a QAM signal).

In some examples, the TM symbol period is timed to correspond with an integer multiple of the period of the sinusoidal signal. In other words, the TM symbol period may be timed to include an integer number of cycles of the sinusoidal signal.

In some examples, the TM symbol period is related to the symbol period of the non-TM signal. For example, the TM symbol period can be an integer multiple of the symbol period of the non-TM signal. The symbol period of the non-TM signal can be an integer multiple of the symbol period of the TM symbol period.

In some implementations, the transmitter filters the combined signal before transmission. For example, the transmitter may filter the combined signal with a band pass filter to shape symbols of the non-TM signal to meet constraints of a particular transmission channel or transmission medium.

In some examples, the TM modulated carrier signal may not be subsequently modulated with a non-TM signal. In other words, the TM signal can be generated and transmitted alone, without being combined with a non-TM signal.

In some implementations, the carrier signal is modulated with the non-TM signal before applying the TM signal to the carrier. For example, the transmitter can insert the TM signal into the phase of the carrier after the carrier signal is modulated with the non-TM signal.

In some examples, the TM modulated carrier signal may not be subsequently modulated with a non-TM signal. In other words, the TM signal can be generated and transmitted alone, without being combined with a non-TM signal.

Figure 13:
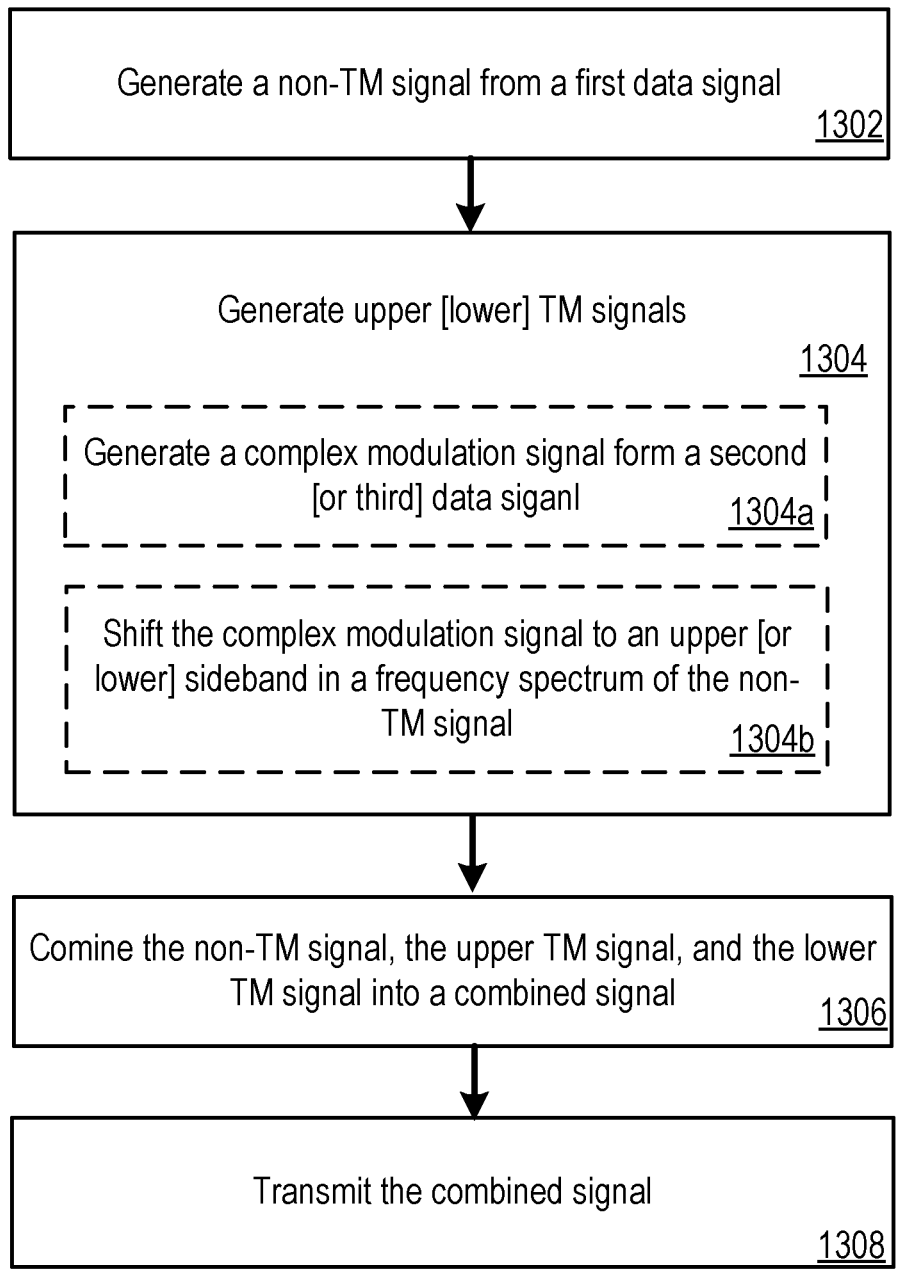
FIG. 13 depicts an example process for producing independent TM signals as sidebands to a non-TM signal that can be executed in accordance with implementations of the present disclosure.

FIG. 13 depicts an example process 1300 for producing independent TM signals as sidebands to a non-TM signal that can be executed in accordance with implementations of the present disclosure. For example, process 1300 can be executed by transmitter 1100. In some examples, the example process 1300 can be provided as computer-executable instructions executed using one or more processing devices (e.g., a digital signal processor) or communication devices (e.g., communication devices 102 of FIG. 1). In some examples, the process 1300 may be hardwired electrical circuitry, for example, as an ASIC or an FPGA device. In some examples, the process 1300 may be executed by an SDR.

The transmitter generates a non-TM signal from a first input data signal (1302). For example, the transmitter can modulate the first data signal using modulation including, but not limited to, FM, PM, AM, or QAM. The non-TM signal has a frequency spectrum that occupies a given bandwidth. For example, the bandwidth of the non-TM signal is defined by a spectral mask (e.g., a spectral mask of a given communication channel in which the signal will be transmitted). In some examples, the bandwidth of the non-TM signal can be defined by power spectrum of the non-TM signal. For example, the bandwidth can be defined by the 3 dB frequencies of the non-TM signal.

The transmitter generates one or more TM sideband signals (1304). For example, the transmitter can generate a first TM sideband signal (e.g., the upper TM sideband signal) by generating a first modulation signal from a second input data signal (1304a) to provide a first TM sideband signal. In some examples, the transmitter can generate the first TM sideband signal using simple modulation. For example, the transmitter modulate only one of the phase or amplitude of the TM sideband signal. In some examples, the transmitter can generate the first TM sideband signal using complex modulation. For example, the transmitter modulate both the phase an amplitude of the first modulation signal to provide the first TM sideband signal as a complex modulation signal. The transmitter shifts the first TM sideband signal in frequency to an upper sideband in the frequency spectrum of the non-TM signal (1304b). For example, the transmitter shifts the first TM sideband signal to a frequency which lies within the bandwidth of the non-TM signal to provide the first TM signal. The power of the first TM sideband signal is less than a power of the non-TM signal. The transmitter can repeat the process of steps 1304 to generating a second TM signal (e.g., a lower TM sideband signal). For example, the transmitter can generate a second modulation signal from a third input data signal to provide a first TM sideband signal. The transmitter shifts the second TM sideband signal in frequency to a lower sideband in the frequency spectrum of the non-TM signal. For example, the transmitter shifts the second TM sideband signal to a frequency which lies within the bandwidth of the non-TM signal to provide the second TM signal. The power of the second TM sideband signal is less than a power of the non-TM signal. In some implementations, the power of the first (second) TM signal is at least 3 dB less than the power of the non-TM signal. In some implementations, the power of the first (second) TM signal is at least 20 dB less than the power of the non-TM signal. In some implementations, a symbol constellation of the non-TM signal is larger than a symbol constellation of the first (second) TM signal. In some implementations, the non-TM signal, the first TM signal, and the second TM signal have the same symbol frame rate.

The transmitter combines the non-TM signal with the first TM signal and the second TM signal on a common carrier signal to provide a combined signal (1306). The transmitter transmits the combined signal (1308). For example, the transmitter can sum non-TM signal with the first TM signal and the second TM signal. The transmitter can convert the combined signal from digital to analog and shift the combined signal from baseband to a common carrier frequency for transmission. In some implementations, a bandwidth of the combined signal is approximately the same as the bandwidth of the non-TM signal with the spectrum of the combined signal lying within a spectral mask of non-TM signal. In some implementations, a spectral efficiency of the combined signal is greater than 14 bps/Hz, for a 40 dB SNR of the non-TM signal.

In some implementations, generating the first TM signal includes filtering the first TM sideband signal to shape a spectrum of the first TM sideband signal based on spectral mask of the non-TM signal. In some implementations, generating the second TM signal includes filtering the second TM sideband signal to shape a spectrum of the second TM sideband signal based on spectral mask of the non-TM signal. In some implementations, the filtering of the first (second) TM sideband signal shapes the first (second) TM sideband signal to correspond to spectral mask of the non-TM signal.

In some implementations, shifting the first TM sideband signal in frequency to the upper sideband in the frequency spectrum of the non-TM signal places the first TM signal at an upper frequency spacing that is approximately orthogonal to the non-TM signal, and shifting the second TM sideband signal in frequency to the lower sideband in the frequency spectrum of the non-TM signal places the first TM signal at a lower frequency spacing that is approximately orthogonal to the non-TM signal.

Figure 10:
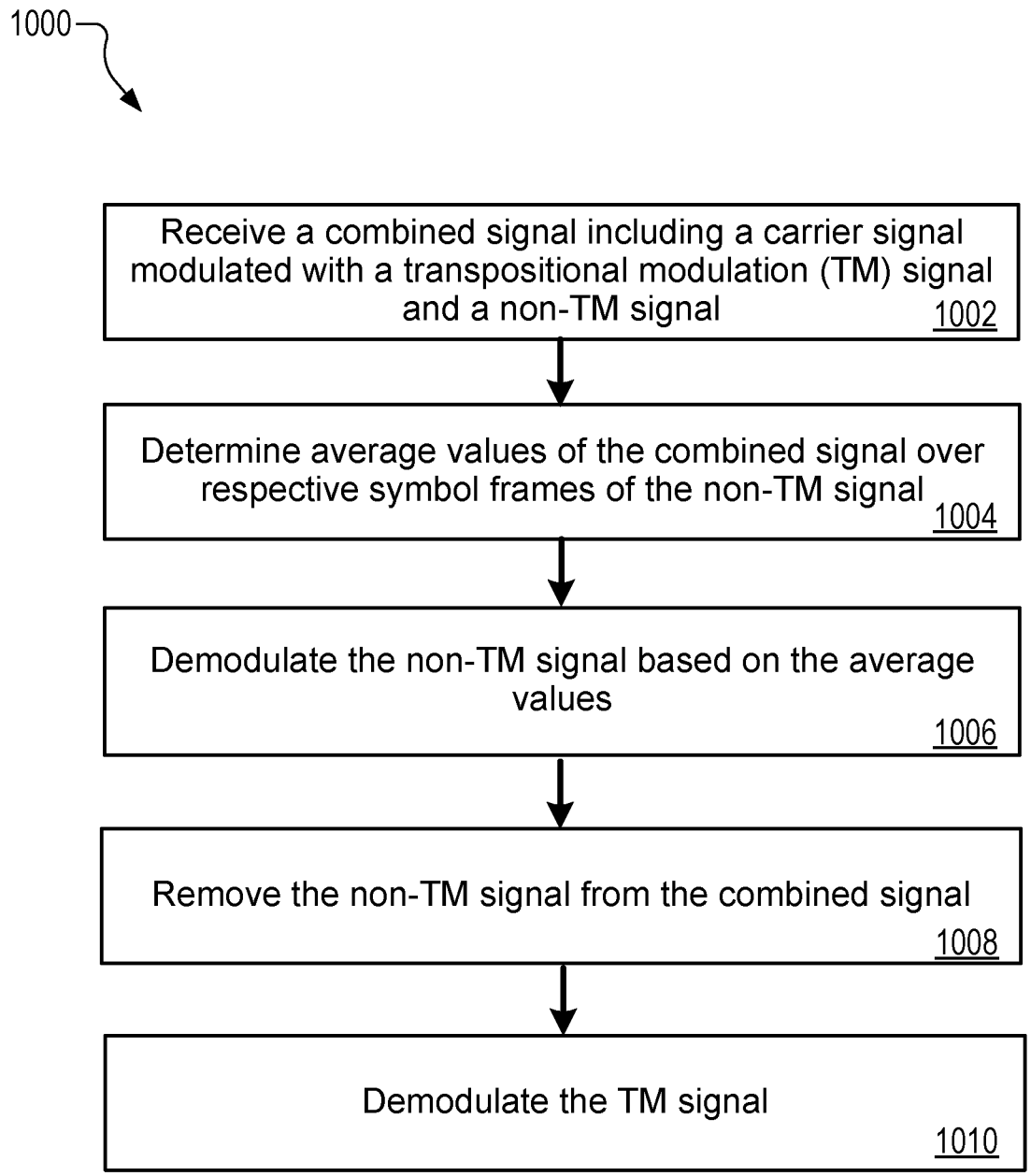

FIG. 10 depicts an example process 1000 for demodulating a carrier signal. Process 1000 can be performed by a receiver such as receiver 106 of FIG. 5 or receiver 800 of FIG. 8. In some examples, the example process 1000 can be provided as computer-executable instructions executed using one or more processing devices (e.g., a digital signal processor) or communication devices (e.g., communication devices 102 of FIG. 1). In some examples, the process 1000 may be hardwired electrical circuitry, for example, as an ASIC or an FPGA device. In some examples, the process 1000 may be executed by an SDR.

A receiver, receives a combined signal that includes a carrier signal modulate with a transpositional modulating (TM) signal and a non-TM signal (1002). The receiver determines average values of the combined signal over respective symbol frames of the non-TM signal (1004). For example, the receiver can determine time-averaged values of the combined signal for each symbol frame of the non-TM signal. The time-averaged values can include a time-averaged amplitude and a time-averaged phase of the combined signal over the symbol frame of the non-TM signal. For example, any effects of the TM signal on the non-TM signal may average out over each symbol frame of the non-TM signal.

The receiver demodulates the non-TM signal based on the average values (1006). The receiver demodulates the non-TM signal to recover the symbols of the non-TM signal. The receiver can then convert the recovered symbols of the non-TM signal to corresponding digital data values and recover a data stream transmitted in the non-TM signal.

The receiver removes the non-TM signal from the combined signal (1008). For example, the receiver can buffer a copy of the combined signal and use the recovered symbol values of the non-TM signal to remove the non-TM signal from respective frames of the buffered copy of the combined signal. For example, the receiver can divide respective frames of the buffered copy of the combined signal by the magnitude and phase of corresponding ones of the recovered non-TM symbols.

The receiver demodulates the TM signal (1010). For example, the receiver can demodulate the TM signal by detecting the discrete phase shifts of a sinusoidal signal inserted into the phase of the carrier. The receiver can extract the phase of the TM modulated carrier signal to obtain the TM signal. For example, the receiver can convert complex values of the combined signal into time varying phase data after the non-TM signal has been removed. The phase data represents the TM signal as a sinusoidal with discrete phase shifts. The value of each discrete phase shift represents a TM symbol that can be converted to a corresponding digital data value. The receiver can detect the discrete phase shifts by cross-correlating the phase data with a reference signal. For example, the reference signal can be synchronized with the symbol frames of the non-TM signal to approximate the sinusoidal signal used by the transmitter to generate the internal TM signal. The receiver can then convert the recovered TM symbols to corresponding digital data values to recover a second data stream transmitted in the TM signal.

Figure 15:
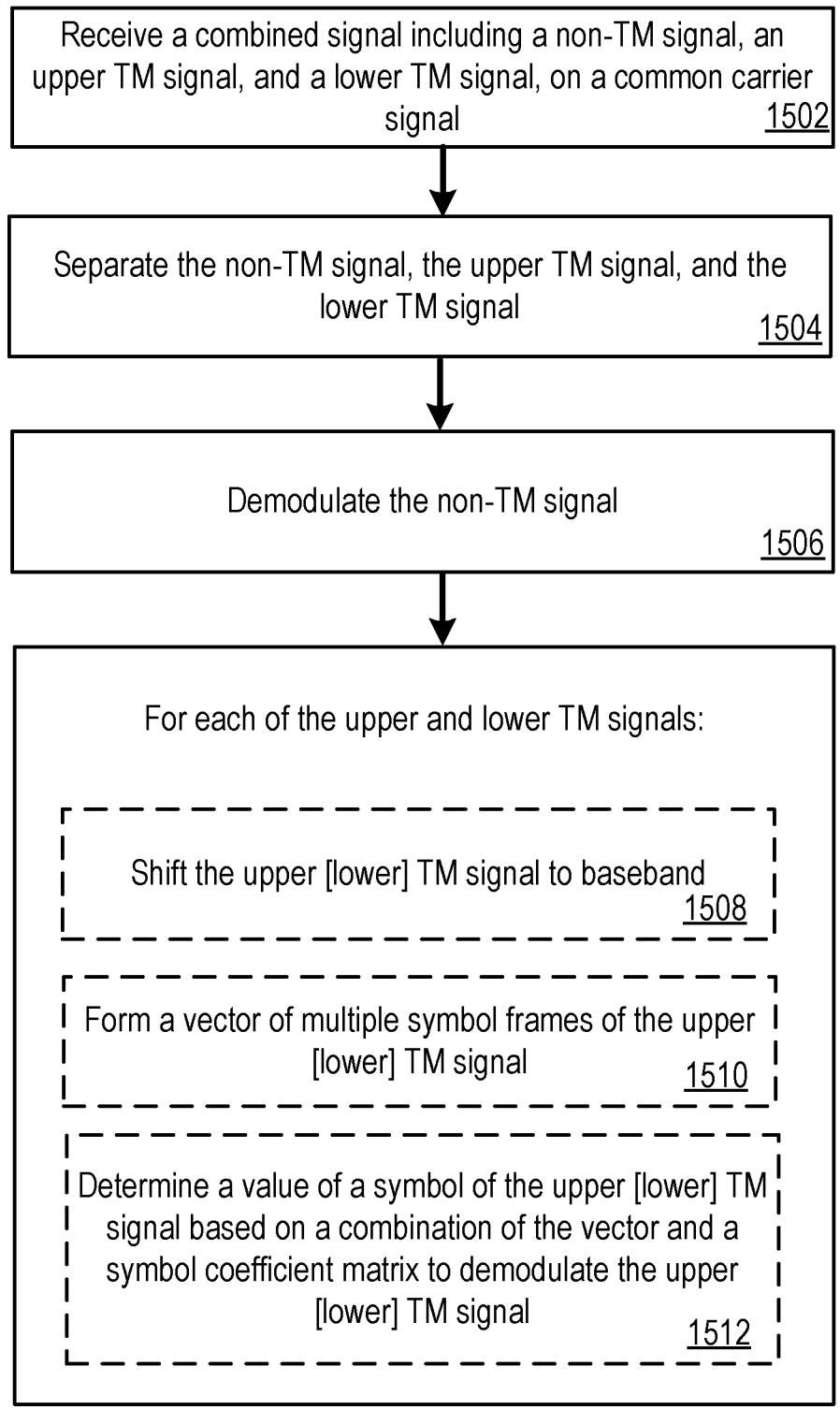
FIG. 15 depicts an example process for demodulating independent TM signals as sidebands to a non-TM signal that can be executed in accordance with implementations of the present disclosure.

FIG. 15 depicts an example process 1500 for demodulating independent TM signals as sidebands to a non-TM signal that can be executed in accordance with implementations of the present disclosure. For example, process 1500 can be executed by receiver 1400. In some examples, the example process 1500 can be provided as computer-executable instructions executed using one or more processing devices (e.g., a digital signal processor) or communication devices (e.g., communication devices 102 of FIG. 1). In some examples, the process 1500 may be hardwired electrical circuitry, for example, as an ASIC or an FPGA device. In some examples, the process 1500 may be executed by an SDR.

The receiver receives a combined signal that includes a carrier signal modulated with a first TM signal, a second TM signal, and a non-TM signal (1502). For example, the first TM signal is positioned, in frequency, at an upper sideband in a frequency spectrum of the non-TM signal, and the second TM signal positioned, in frequency, at a lower sideband in the frequency spectrum of the non-TM signal. The receiver separates the first TM signal, the second TM signal, and the non-TM (1504). For example, the receiver can separate the first TM signal, the second TM signal, and the non-TM signal by separating the first TM signal, the second TM signal, and the non-TM signal using FIR filters. The receiver demodulates the non-TM signal (1506).

For each of the first TM signal and the second TM signal the receiver shifts the TM signal to baseband (1508), forms a vector of multiple symbol frames of the TM signal (1510), and determines a value of a symbol of the TM signal based on a combination of the vector and a symbol coefficient matrix to demodulate the TM signal (1512). For example, the receiver can determine a value of a symbol of the TM signal based on a combination of the vector and a symbol coefficient matrix by determining a dot-product of the vector with the symbol coefficient matrix to obtain the value of the symbol, and mapping the value of the symbol to a bit pattern represented by the value. In some implementations, the vector includes at least six symbol frames of the TM signal.

Figure 16:
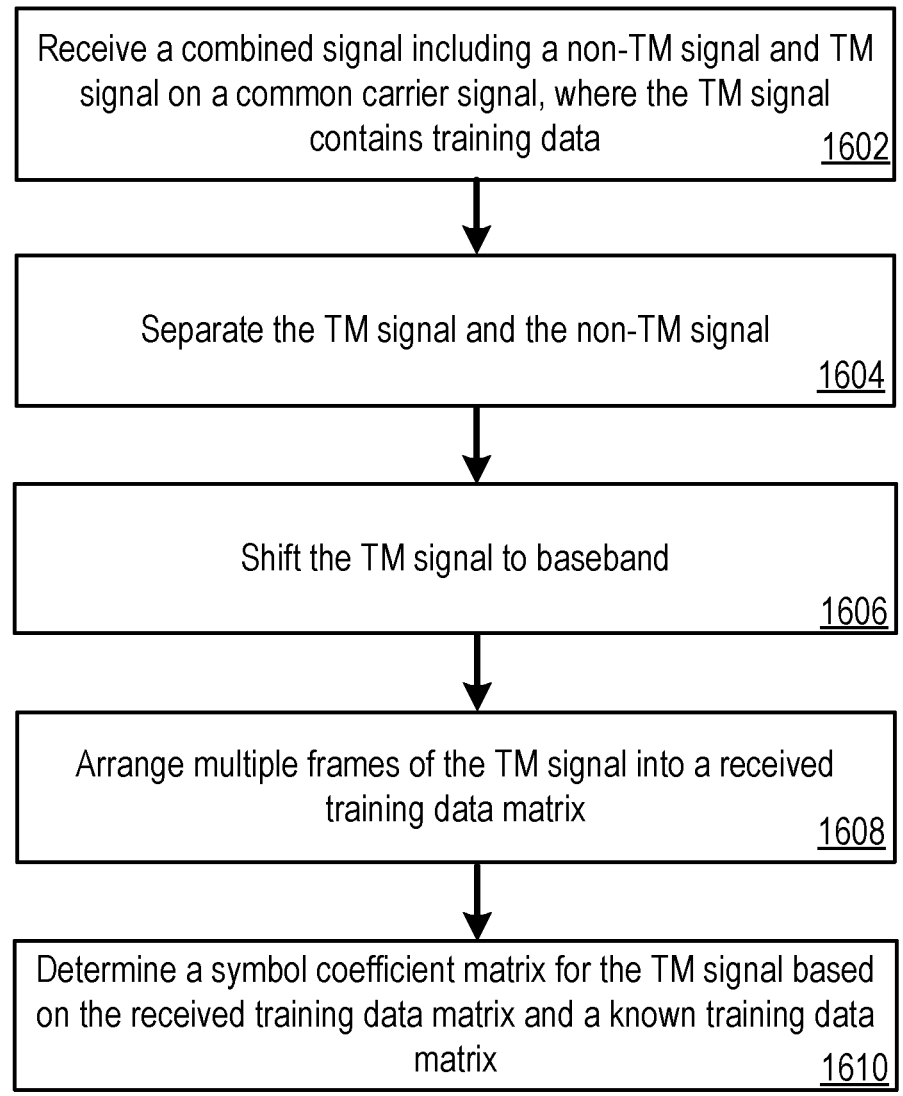
FIG. 16 depicts an example process for training a TM demodulator that can be executed in accordance with implementations of the present disclosure.

FIG. 16 depicts an example process 1600 for training a TM demodulator that can be executed in accordance with implementations of the present disclosure. For example, process 1600 can be executed by receiver 1400. For example, process 1600 can be executed by receiver 1400. In some examples, the example process 1600 can be provided as computer-executable instructions executed using one or more processing devices (e.g., a digital signal processor) or communication devices (e.g., communication devices 102 of FIG. 1). In some examples, the process 1600 may be hardwired electrical circuitry, for example, as an ASIC or an FPGA device. In some examples, the process 1600 may be executed by an SDR.

The process 1600 can be used to generate the coefficient vector for demodulating the individual band signals. FIG. 17 depicts example matrix operations performed as part of the process depicted in FIG. 16. During a training sequence (from either real data or high-fidelity simulation) the known complex symbols for a particular band are arranged in a matrix (C) as shown, and similarly, the complex sample data is arranged in a corresponding fashion. Matrix equations as indicated in the figure, are developed to solve for coefficients which, when applied to the training sequence, produce the correct symbols in a minimum norm/least-squares sense. The process 1600 can use a pseudo-inverse derived from the Singular Value Decomposition (SVD). Control of the rank of the solution can also be applied to mitigate against cases of near singularity. The method of using SVD to accomplish the pseudo-inverse is illustrated in the matrix operations shown in FIG. 17.

The receiver receives a combined signal including a carrier signal modulated with a TM signal and a non-TM signal where the TM signal contains pre-defined training data (1602). For example, the TM signal is positioned, in frequency, at an upper or lower sideband in a frequency spectrum of the non-TM signal. The receiver separates the TM signal and the non-TM signal (1604). For example, the receiver can separate the TM signal and the non-TM signal using FIR filtering. The receiver shifts the TM signal to baseband (1606). The receiver arranges multiple frames of the TM signal into a received training data matrix (1608). The receiver determines a symbol coefficient matrix for the TM signal based on the received training data matrix and a known (e.g., pre-defined) training data matrix (1601). For example, the receiver can determine the symbol coefficient matrix for the TM signal based on the received training data matrix and the known training data matrix by determining an inverse or pseudo-inverse of the received training data matrix based on a singular value decomposition (SVD) of the received training data matrix, and multiplying the pseudo-inverse of the received training data matrix with the known training data matrix to provide the symbol coefficient matrix.

In some implementations, the received training data matrix includes at least six rows of N frames of the TM signal, where a first through N−1th frame of the second row are equal to a second through nth frame of the first row.

Implementations of the subject matter and the operations described in this specification can be realized in analog or digital electronic circuitry, or in computer software, firmware, or hardware, including the structures disclosed in this specification and their structural equivalents, or in combinations of one or more of them. Implementations of the subject matter described in this specification can be realized using one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal; a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer can include a processor for performing actions in accordance with instructions and one or more memory devices for storing instructions and data. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

While this specification contains many specific implementation details, these should not be construed as limitations on the scope of any implementation of the present disclosure or of what can be claimed, but rather as descriptions of features specific to example implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing can be advantageous.

What is claimed is:

1. A method of modulating a carrier signal, the method comprising:
    generating a non-transpositional modulation (non-TM) signal from a first data signal, the non-TM signal having a frequency spectrum that occupies a bandwidth;
    generating a first TM signal by:
        generating a first modulation from a second data signal, and
        shifting the first modulation signal in frequency to a sideband in the frequency spectrum of the non-TM signal which lies within the bandwidth to provide the first TM signal;
    combining the non-TM signal with the first TM signal on a common carrier signal to provide a combined signal; and
    transmitting the combined signal.

2. The method of claim 1, wherein the bandwidth of the non-TM signal is defined by a spectral mask.

3. The method of claim 1, wherein a power of the first TM signal is at least 3 dB less than a power of the non-TM signal.

4. The method of claim 1, wherein a power of the first TM signal is at least 20 dB less than a power of the non-TM signal.

5. The method of claim 1, further comprising:
    generating a second TM signal by:
        generating a second modulation signal from a third data signal, and
        shifting the second modulation signal in frequency to a lower sideband in the frequency spectrum of the non-TM signal which lies within the bandwidth to provide the second TM signal; and
        combining the non-TM signal with the first TM signal and the second TM signal on the common carrier signal to provide a combined signal.

6. The method of claim 5, wherein the first modulation signal is a first complex modulated signal and the second modulation signal is a second complex modulated signal.

7. The method of claim 6, wherein the first modulation signal is modulated in both amplitude and phase, and wherein the second modulation signal is modulated in both amplitude and phase.

8. The method of claim 1, wherein a symbol constellation of the non-TM signal is larger than a symbol constellation of the first TM signal.

9. The method of claim 1, wherein a bandwidth of the combined signal is approximately the same as the bandwidth of the non-TM signal with the spectrum of the combined signal lying within a spectral mask of non-TM signal.

10. The method of claim 1, wherein a spectral efficiency of the combined signal is greater than 14 bps/Hz, for a 40 dB signal-to-noise ratio (SNR) of the non-TM signal.

11. The method of claim 1, wherein generating the first TM signal further comprises filtering the first modulation signal to shape a spectrum of the first modulation signal based on a spectral mask of the non-TM signal.

12. The method of claim 11, wherein the filtering of the first modulation signal shapes the first modulation signal to correspond to the spectral mask of the non-TM signal.

13. The method of claim 1, wherein shifting the first modulation signal in frequency to the sideband in the frequency spectrum of the non-TM signal comprises shifting the first modulation signal in frequency to a null of the sideband in the frequency spectrum of the non-TM signal.

14. The method of claim 1, wherein shifting the first modulation signal in frequency to the sideband in the frequency spectrum of the non-TM signal places the first TM signal at an upper frequency spacing that is approximately orthogonal to the non-TM signal.

15. The method of claim 1, wherein the non-TM signal and the first TM signal have a same symbol frame rate.

16. A transmitter configured to perform operations comprising:
    generating a non-transpositional modulation (non-TM) signal from a first data signal, the non-TM signal having a frequency spectrum that occupies a bandwidth;
    generating a first TM signal by:
        generating a first modulation from a second data signal, and
        shifting the first modulation signal in frequency to a sideband in the frequency spectrum of the non-TM signal which lies within the bandwidth to provide the first TM signal;
    combining the non-TM signal with the first TM signal on a common carrier signal to provide a combined signal; and
    transmitting the combined signal.

17. The transmitter of claim 16 comprising a field programmable gate array programed to perform the operations.

18. The transmitter of claim 16 comprising an application specific integrated circuit with circuitry configured to perform the operations.

19. A transmitter comprising:
    at least one processor; and
    a data store coupled to the at least one processor having instructions stored thereon which, when executed by the at least one processor, causes the at least one processor to perform operations comprising:
    generating a non-transpositional modulation (non-TM) signal from a first data signal, the non-TM signal having a frequency spectrum that occupies a bandwidth;
    generating a first TM signal by:
        generating a first modulation from a second data signal, and
        shifting the first modulation signal in frequency to an upper sideband in the frequency spectrum of the non-TM signal which lies within the bandwidth to provide the first TM signal;
    combining the non-TM signal with the first TM signal on a common carrier signal to provide a combined signal; and
    transmitting the combined signal.

20. The transmitter of claim 19, wherein the at least one processor includes: a field programmable gate array (FPGA), an application specific integrated circuit (ASIC), or a software defined radio (SDR).

* * * * *